United States Patent
Fukuda et al.

(10) Patent No.: US 12,384,332 B2
(45) Date of Patent: Aug. 12, 2025

(54) PEDAL DEVICE

(71) Applicant: DENSO CORPORATION, Kariya (JP)

(72) Inventors: Yasuhisa Fukuda, Kariya (JP); Etsugo Yanagida, Kariya (JP); Daisuke Hokuto, Kariya (JP); Takao Yamamoto, Kariya (JP)

(73) Assignee: DENSO CORPORATION, Kariya (JP)

(*) Notice: Subject to any disclaimer, the term of this patent is extended or adjusted under 35 U.S.C. 154(b) by 11 days.

(21) Appl. No.: 18/451,492

(22) Filed: Aug. 17, 2023

(65) Prior Publication Data

US 2023/0391298 A1    Dec. 7, 2023

Related U.S. Application Data

(63) Continuation of application No. PCT/JP2022/005053, filed on Feb. 9, 2022.

(30) Foreign Application Priority Data

Feb. 25, 2021 (JP) ................. 2021-029093

(51) Int. Cl.
*B60T 7/04* (2006.01)
*G05G 1/30* (2008.04)
(Continued)

(52) U.S. Cl.
CPC ............... *B60T 7/04* (2013.01); *G05G 1/44* (2013.01); *G05G 1/46* (2013.01); *G05G 5/03* (2013.01); *G05G 1/50* (2013.01)

(58) Field of Classification Search
CPC .. G05G 1/30; G05G 1/44; G05G 1/46; G05G 1/50; G05G 5/03; B60T 7/04; B60K 26/021
See application file for complete search history.

(56) References Cited

U.S. PATENT DOCUMENTS 1,883,437 A    10/1932  Adams
2,726,554 A *  12/1955  Mcclellan ............... B60T 7/04
                                                74/478
(Continued)

FOREIGN PATENT DOCUMENTS

CN    201511825 U  *  6/2010
FR    3066286 B1  *  6/2019  ............ G05G 1/44
(Continued)

OTHER PUBLICATIONS

U.S. Appl. No. 18/452,360 to Yasuhisa Fukuda, filed Aug. 18, 2023 (74 pages).

*Primary Examiner* — Adam D Rogers
(74) *Attorney, Agent, or Firm* — Nixon & Vanderhye P.C.

(57) ABSTRACT

An arm includes an arm one end and an arm body extended from the arm one end. The arm is coupled with a pedal pad at the arm one end and is coupled with a reaction force generation mechanism on an counter-operation side. A stopper part is a component separate from the pedal pad and fixed to the pedal pad. One part, which is one of the pedal pad and the stopper part, includes a first arrangement section, and the other part, which is the other of the pedal pad and the stopper part, includes a second arrangement section. The first arrangement section and the second arrangement section interpose the arm one end therebetween and hold the arm one end against the pedal pad.

17 Claims, 25 Drawing Sheets

(51) Int. Cl.
*G05G 1/44* (2008.04)
*G05G 1/46* (2008.04)
*G05G 5/03* (2008.04)
*G05G 1/50* (2008.04)

(56) References Cited

U.S. PATENT DOCUMENTS

| | | | | |
|---|---|---|---|---|
| 3,623,693 | A * | 11/1971 | Hill | B60K 26/021 |
| | | | | 251/38 |
| 4,899,614 | A * | 2/1990 | Kataumi | G05G 1/506 |
| | | | | 403/397 |
| 11,247,650 | B2 * | 2/2022 | Colasanta | B60T 7/04 |
| 12,017,529 | B2 * | 6/2024 | Kihara | B60K 26/02 |
| 12,204,360 | B2 * | 1/2025 | Hokuto | B60T 7/042 |
| 2004/0040408 | A1 | 3/2004 | Shaw et al. | |
| 2010/0175497 | A1 | 7/2010 | Nozu et al. | |
| 2014/0117602 | A1 | 5/2014 | Jeon | |
| 2017/0174029 | A1 | 6/2017 | Asbeck et al. | |
| 2018/0283967 | A1 | 10/2018 | Kato | |
| 2023/0286378 | A1 * | 9/2023 | Kihara | G05G 25/02 |
| 2023/0393605 | A1 * | 12/2023 | Hokuto | B60T 7/042 |
| 2023/0393606 | A1 * | 12/2023 | Fukuda | G05G 1/44 |
| 2023/0393607 | A1 * | 12/2023 | Yamamoto | G05G 1/44 |
| 2023/0406270 | A1 * | 12/2023 | Hokuto | B60T 7/06 |
| 2024/0059143 | A1 * | 2/2024 | Ito | G05G 1/44 |
| 2024/0059260 | A1 * | 2/2024 | Ito | B60T 8/17 |
| 2024/0059261 | A1 * | 2/2024 | Hokuto | B60T 8/17 |
| 2024/0059262 | A1 * | 2/2024 | Hokuto | B60T 8/17 |
| 2024/0061462 | A1 * | 2/2024 | Fukuda | G05G 1/44 |
| 2024/0069587 | A1 * | 2/2024 | Fukuda | B60T 7/042 |
| 2024/0069588 | A1 * | 2/2024 | Arao | B60T 7/06 |

FOREIGN PATENT DOCUMENTS

| | | | | |
|---|---|---|---|---|
| JP | S6452816 | U | 3/1989 | |
| JP | H07205775 | A | 8/1995 | |
| JP | 2001109532 | A | 4/2001 | |
| JP | 2001294058 | A | 10/2001 | |
| JP | 2014084091 | A | 5/2014 | |
| JP | 2017053796 | A | 3/2017 | |
| JP | 2017506597 | A | 3/2017 | |
| WO | WO-2007003810 | A2 * | 1/2007 | G05G 1/44 |
| WO | 2008153204 | A1 | 12/2008 | |
| WO | 2022181326 | A1 | 9/2022 | |
| WO | 2022181329 | A1 | 9/2022 | |
| WO | 2022181330 | A1 | 9/2022 | |
| WO | 2022181331 | A1 | 9/2022 | |

* cited by examiner

PEDAL DEVICE

CROSS REFERENCE TO RELATED APPLICATION

The present application is a continuation application of International Patent Application No. PCT/JP2022/005053 filed on Feb. 9, 2022, which designated the U.S. and claims the benefit of priority from Japanese Patent Application No. 2021-029093 filed on Feb. 25, 2021. The entire disclosures of all of the above applications are incorporated herein by reference.

TECHNICAL FIELD

The present invention relates to a pedal device provided in a vehicle.

BACKGROUND

A known pedal device is operated when stepped by an operator.

SUMMARY

According to an aspect of the present disclosure, a pedal device for a vehicle comprises a pedal pad and an arm coupled to the pedal pad.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
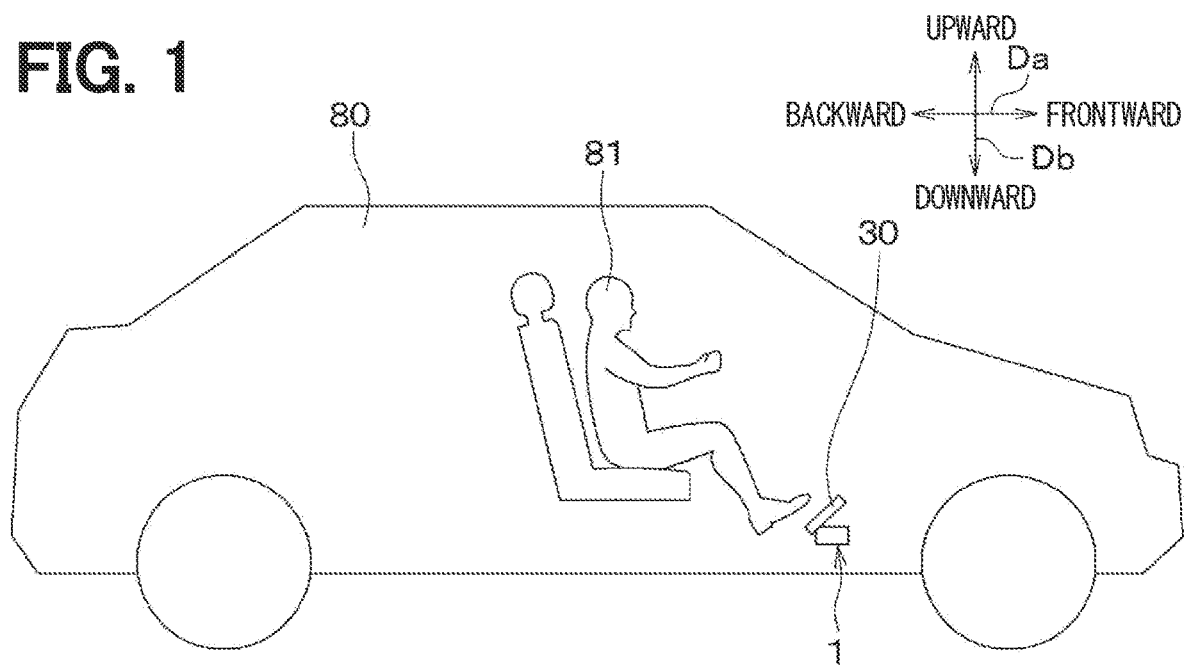
FIG. 1 is a schematic diagram showing a vehicle equipped with a pedal device in a first embodiment.

Hereinafter, examples of the present disclosure will be described.

According to an example of the present disclosure, a pedal device includes a pedal housing, a pedal pad rotatably coupled with the pedal housing, and a connection link. The connection link is comprised of a connection head and a connection body. The connection head of the connection link is rotatably fit into a connection recessed portion located on a pedal back side of the pedal pad, provided on the counter-operation side opposite to the operation side on which the pedal pad is stepped on by an operator. The connection body of the connection link is extended from the connection head to the counter-operation side and is inserted into the pedal housing.

In a pedal device according to an example, a connection head of a connection link is rotatably joined to a connection recess of a pedal pad. When the connection head and the connection recess are joined each other, the connection recess of the pedal pad and a peripheral part thereof may be elastically deformed and the connection head may be thereby inserted into the connection recess.

For this reason, a sufficient width of an overlap between the connection recess of the pedal pad and the connection head of the connection link may be difficult to ensure to maintain the joining between the connection recess and the connection head. As a result, for example, when external force is accidentally applied to the pedal pad, it is assumed that the connection recess and the connection head are prone to disjoin. That is, it is guessed that the connection link is difficult to join to the pedal pad with sufficient strength. As a result of detailed consideration by the present inventors, the foregoing has been found.

According to an example of the present disclosure, a pedal device is to be provided in a vehicle. The pedal device comprises:

a pedal pad configured to be stepped on by an operator from a predetermined operation side;

an arm including an arm one end and an arm body extended from the arm one end to a reaction-operation side, which is opposite to the operation side, the arm coupled with the pedal pad at the arm one end and coupled on a counter-operation side with a reaction force generation mechanism, the reaction force generation mechanism configured to generate a reaction force against a stepping force applied to the pedal pad by the operator; and a stopper part that is a component separate from the pedal pad and fixed to the pedal pad.

The arm one end is widened from the arm body in a widening direction, which is perpendicular to an extending direction, in which the arm body is extended. One part, which is one of the pedal pad and the stopper part, includes a first arrangement section that has an insertion hole, into which the arm body is inserted, and located on the counter-operation side relative to the arm one end. An other part, which is an other of the pedal pad and the stopper part, includes a second arrangement section located on an operation side of the first arrangement section across the arm one end. The first arrangement section and the second arrangement section hold the arm one end against the pedal pad in a state where the arm one end is interposed between the first arrangement section and the second arrangement section.

Thus, the first arrangement section and the second arrangement section respectively belong to different components; therefore, when external force is applied in such a direction that the arm end pushes the first arrangement section, a width sufficient for the first arrangement section to receive the arm end against the external force can be ensured. For this reason, an arm equivalent to the above-mentioned connection link can be coupled with the pedal pad with sufficient strength.

Hereafter, a description will be given to each embodiment with reference to the drawings. Among the following individual drawings, an identical or equivalent element will be marked with an identical numeral or symbol in each drawing.

First Embodiment

As shown in FIG. 1, a pedal device 1 in the present embodiment is a device mounted in a vehicle 80 and is stepped on by an operator 81 as an occupant of the vehicle 80 through stepping force. The pedal device 1 is provided in the vehicle 80 as a brake pedal device for performing braking operation to apply brake to the vehicle 80.

In detail, the vehicle 80 in FIG. 1 adopts a brake-by-wire system and the pedal device 1 is a brake pedal device used for the brake-by-wire system. The brake-by-wire system is a system in which a brake pad of each wheel is driven through a brake circuit by liquid pressure generated at a master cylinder by drive control by an electronic control device mounted in the vehicle 80 based on an electrical signal outputted from the pedal device 1.

Each of the both-end arrows in FIG. 1 indicates an orientation of the vehicle 80 equipped with the pedal device 1. That is, in FIG. 1, a vehicle front-back direction Da, which is the front-back direction of the vehicle 80, and a vehicle vertical direction Db, which is the up-down direction of the vehicle 80 (in other words, the perpendicular direction of the vehicle 80) are indicated by the both-end arrows. In the description of the present embodiment, frontward in the vehicle front-back direction Da is also referred to as vehicle front; backward in the vehicle front-back direction Da is also referred to as vehicle back; upward in the vehicle up-down direction Db is also referred to as vehicle upward; and downward in the vehicle up-down direction Db is also referred to as vehicle downward.

Figure 2:
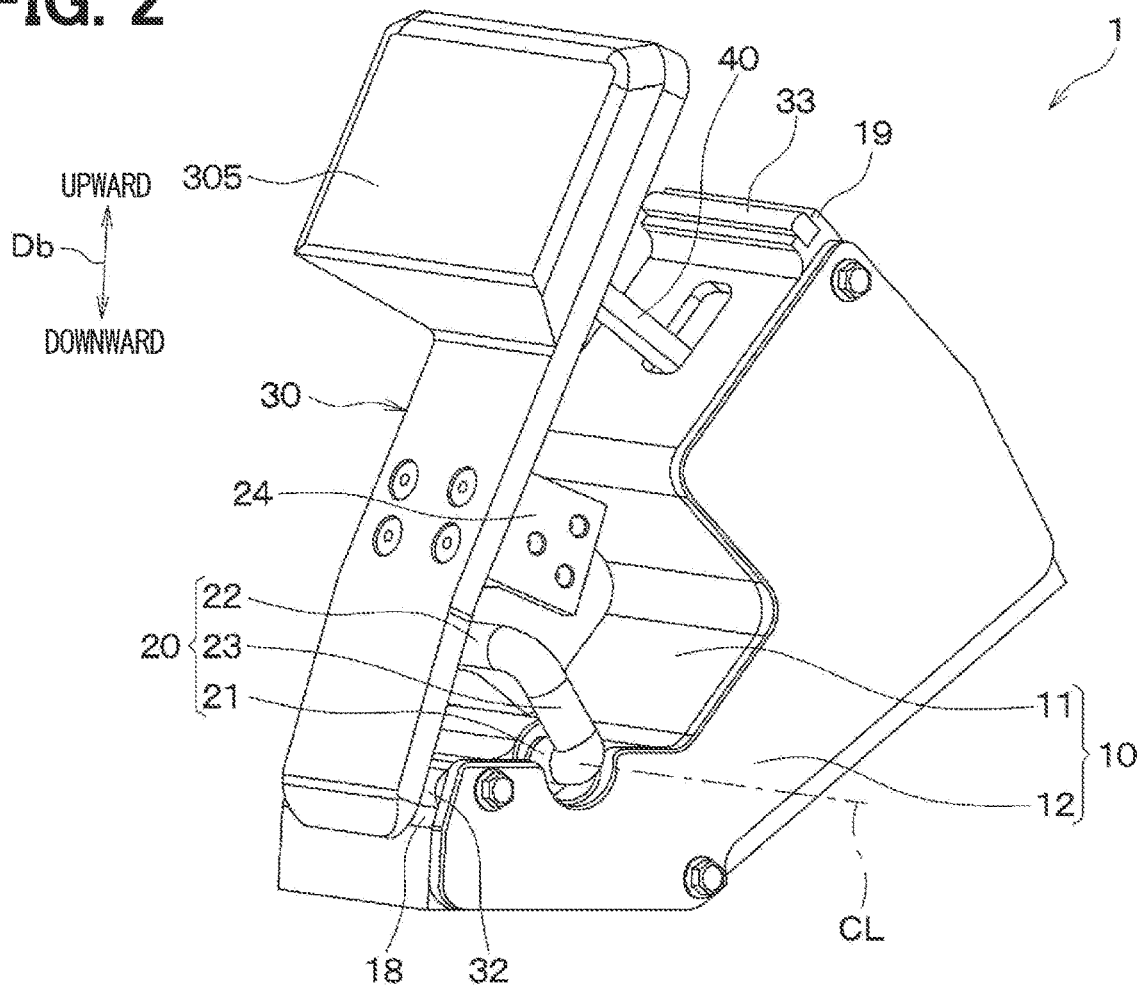
FIG. 2 is a perspective view of a pedal device in the first embodiment.

As shown in FIG. 2 and FIG. 2, the pedal device 1 is an organ type pedal device. The pedal device 1 includes a housing 10, a shaft 20, a pedal pad 30, an arm 30, a reaction force generation mechanism 50, a stopper part 56, a rotation angle sensor and the like, not shown. The organ type pedal device 1 is those so configured that a portion of the pedal pad 30 stepped on by an operator 81 is located vehicle upward relative to the rotation center CL of the pedal pad 30 (in other words, upward in the perpendicular direction as is mounted in the vehicle). In the organ type pedal device 1, the portion of the pedal pad 30 vehicle upward relative to the rotation center CL is rotationally moved to the floor 2 side or the dash panel side in the vehicle compartment according to increase in stepping force applied to the pedal pad 30 by the operator 81. In the description of the present embodiment, the rotation center CL of the pedal pad 30 is also referred to as pedal axial center CL.

Figure 3:
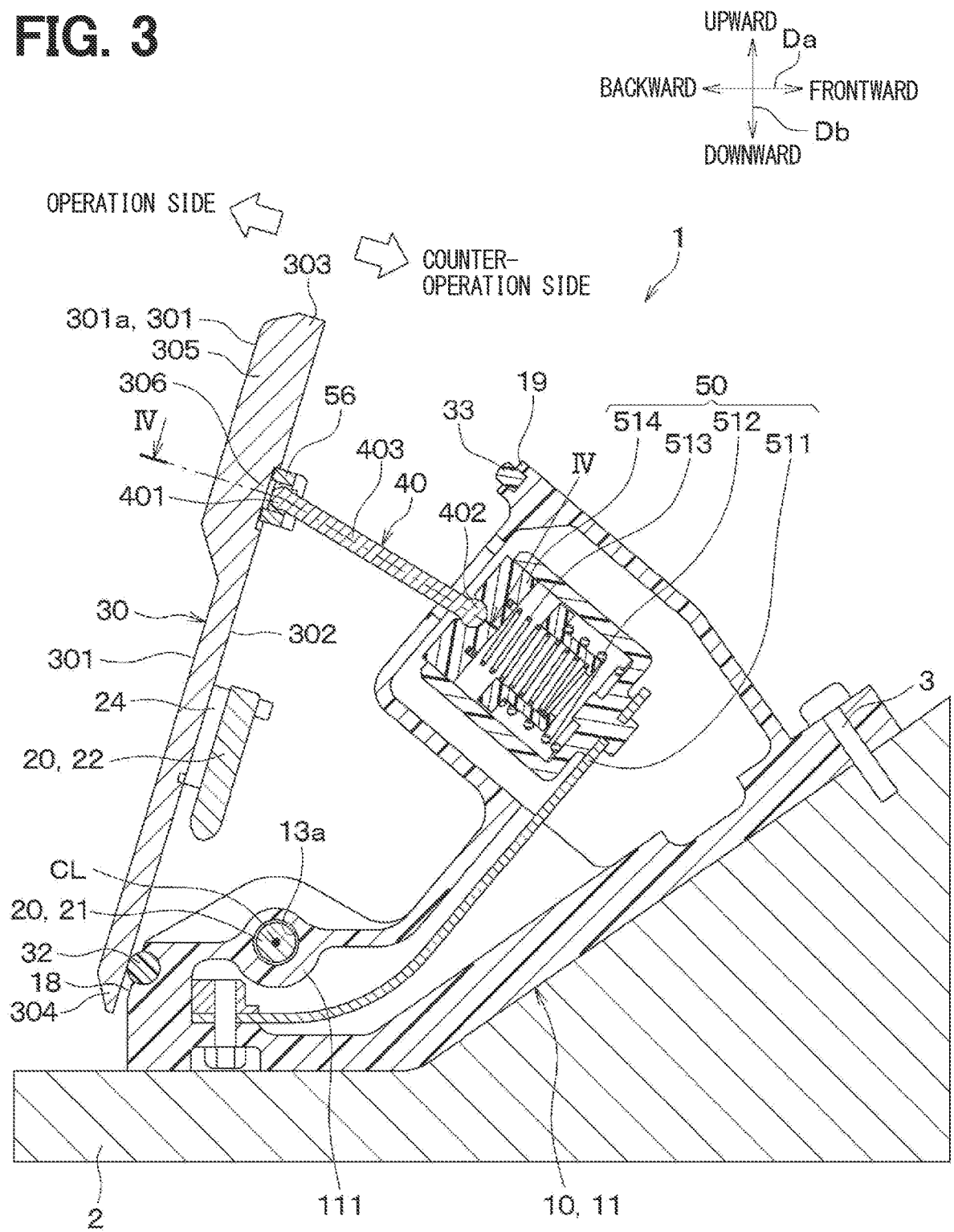
FIG. 3 is a sectional view showing a section perpendicular to the pedal axial center of a pedal device in the first embodiment.

As shown in FIG. 3, the housing 10 is attached to a part of a vehicle body constituting the vehicle 80. In detail, the housing 10 is attached to the floor 2, the dash panel, or the like in the vehicle compartment of the vehicle 80 by a screw 3. The dash panel is a partition wall separating the vehicle compartment exterior, such as an engine room, and the vehicle compartment interior of the vehicle 80 and is also referred to as bulkhead sometimes. FIG. 2 and FIG. 3 show the pedal device 1 in a non-stepped state in which the pedal pad 30 is not stepped on by an operator 81.

As shown in FIG. 2 and FIG. 3, the housing 10 includes a housing body 11 and a housing cover 12. The housing 10 is provided between the pedal pad 30 as is most deeply stepped on by an operator 81 and the floor 2 constituting a part of the vehicle body. A space for providing the reaction force generation mechanism 50 and the like is formed inside the housing body 11. The housing body 11 has a shaft receiving portion 111 for rotatably supporting the shaft 20. The housing cover 12 is provided on a side face of the housing body 11 and closes a side face opening of the space formed inside the housing body 11.

The shaft 20 is in a shape obtained by bending, for example, a metal column a plurality of time and includes a stem portion 21, a fixed portion 22, and a coupling portion 23. The stem portion 21, coupling portion 23, and fixed portion 22 are configured as a single component as a whole and are serially connected in the order of the stem portion 21 and the coupling portion 23 and the fixed portion 22.

The shaft 20 is a rotation axis constituting member having the stem portion 21 as the rotation axis of the pedal pad 30. The stem portion 21 forms a columnar stem shape around the pedal axial center CL and is inserted into a shaft hole 13a formed inside the shaft receiving portion 111.

The shaft receiving portion 111 has the rotation angle sensor, not shown, attached thereto. As the rotation angle sensor, for example, a sensor of various types, such as magnetic or optical, can be adopted. The rotation angle sensor provided in the shaft receiving portion 111 detects a rotation angle of the stem portion 21 and outputs an electrical signal indicating the rotation angle of the stem portion 21 to an electronic control device. The pedal pad 20 and the shaft 20 are fixed to each other and are integrally rotated; therefore, a rotation angle of the stem portion 21 of the shaft 20 is identical with a rotation angle of the pedal pad 30.

The fixed portion 22 of the shaft 20 is a portion unrotatably fixed to the pedal pad 30. The fixed portion 22 is bent and formed, for example, in an L shape. In the present embodiment, the fixed portion 22 is fixed by a fixing fitting 24 to a pedal back side 302 of the pedal pad 30, which is a face opposite to a face receiving stepping force from an operator 81. The coupling portion 23 is a portion coupling the stem portion 21 and the fixed portion 22 with each other.

The shaft 20 is rotatably supported in the shaft receiving portion 111 provided in the housing body 11. In detail, the stem portion 21 of the shaft 20 is rotatably supported by the shaft receiving portion 111 and thus, the shaft 20 is supported in the housing 10 and is rotatable about the pedal axial center CL relative to the housing 10. The shaft 20 is supported only by the shaft receiving portion 111 provided in the housing body 11 and is not supported by the housing cover 12.

The pedal pad 30 is a member of the pedal device 1 stepped on by an operator 81 from the predetermined operation side. The pedal pad 30 in the present embodiment is formed of, for example, metal and is formed in a shape of a plate with a direction perpendicular to the pedal axial center CL taken as thickness direction. The pedal pad 30 is so located that one side in the thickness direction is taken as operation side and the other side in the thickness direction is taken as counter-operation side, which is the side opposite to the operation side. The pedal pad 30 has a pedal front side 301 facing toward the operation side and the pedal back side 302 facing toward the counter-operation side.

The pedal pad 30 is slantly located in the vehicle front-back direction Da. Specifically, the pedal pad 30 is located in such a position that the pedal pad is slanted in the vehicle front-back direction Da so that when the pedal pad 30 is not stepped on, the upper end 303 of the pedal pad 30 is positioned at vehicle front relative to the lower end 304 thereof.

The pedal head 30 includes a thick wall portion 305 located vehicle upward relative to the pedal pad 30. The thick wall portion 305 is provided as a portion stepped on by an operator 81, includes the upper end 303 of the pedal pad 30, and is located vehicle upward relative to the pedal axial center CL. The pedal front side 301 reaches the thick wall portion 305 and a face of the pedal front side 301 formed on the operation side of the thick wall portion 305 functions as a stepping surface 301a stepped on by an operator 81. The stepping surface 301a of the pedal pad 30 is a part of the pedal front side 301. The disposition of the pedal pad 30 is not limited to one shown in FIG. 2 and FIG. 3 and the pedal pad may be located, for example, perpendicularly to the vehicle front-back direction Da.

Since the pedal pad 30 is fixed to the shaft 20, as mentioned above, the pedal pad 30 is integrally rotated together with the shaft 20. Therefore, the pedal pad 30 is rotationally moved around the pedal axial center CL in conjunction with stepping operation by an operator 81. In detail, since the pedal pad 30 is rotationally moved within a predetermined limited rotation angle range of less than one turn, the pedal pad 30 swings around the pedal axial center CL in conjunction with stepping operation by an operator 81.

The above-mentioned rotation angle range in the rotational movement of the pedal pad 30 is specifically a range from the minimum rotational position to the maximum rotational position of the pedal pad 30. That is, when the pedal pad 30 is not stepped on, the rotation angle of the pedal pad 30 corresponds to the minimum rotational position and at the time of maximum stepping when the pedal pad 30 is fully stepped on by an operator 81, the rotation angle of the pedal pad 30 corresponds to the maximum rotational position.

Within the above-mentioned rotation angle range, for example, the pedal pad 30 rotationally moves so that the upper end 303 of the pedal pad 30 is more displaced vehicle frontward and vehicle downward as stepping force applied to the pedal pad 30 by an operator 81 from the operation side is more increased. Conversely, the pedal pad 30 is rotationally moved by action of the reaction force generation mechanism 50 so that the upper end 303 of the pedal pad 30 is more displaced vehicle backward and vehicle upward as stepping force applied to the pedal pad 30 by an operator 81 from the operation side is more reduced.

In the present embodiment, the minimum rotational position of the pedal pad 30 is defined by a full close stopper 32 as a first stopper and the maximum rotational position of the pedal pad 30 is defined by a full open stopper 33 as a second stopper. Each of the full close stopper 32 and the full open stopper 33 is formed of resin, rubber, or the like.

The full close stopper 32 is provided at a portion of the housing 10 located behind the pedal axial center CL in terms of the vehicle. Specifically, the full close stopper 32 is embedded in a wall surface 18 facing vehicle backward and slantly vehicle upward in a portion of the housing 10 located vehicle backward. The full close stopper 32 is brought into contact with the lower end 304 of the pedal back side 302 or the vicinity thereof when the pedal pad 30 is not stepped on and holds the pedal pad 30 in the minimum rotational position.

The full open stopper 33 is provided in a portion of the housing 10 located vehicle frontward relative to the pedal axial center CL. Specifically, the full open stopper 33 is provided in an upper end 19 of a wall surface of the housing 10 located vehicle frontward. In detail, the full open stopper 33 is embedded in a wall surface facing vehicle backward and slantly vehicle upward in a portion of the housing 10 located vehicle frontward. The full open stopper 33 is brought into contact with the upper end 303 of the pedal back side 302 or the vicinity thereof when the pedal pad 30 is fully stepped on and holds the pedal pad 30 in the maximum rotational position.

As shown in FIG. 2 and FIG. 3, the reaction force generation mechanism 50 is located on the counter-operation side with respect to the pedal pad 30 and is housed in the housing 10. The reaction force generation mechanism 50 includes a plurality of spring members 511, 512, 513 and generates reaction force against stepping force applied to the pedal pad 30 by an operator 81 by elastic deformation of the spring members 511, 512, 513. The spring members 511, 512, 513 are coupled with one another so that, for example, when the reaction force generation mechanism 50 generates reaction force against stepping force, all the spring members 511, 512, 513 are elastically deformed.

In the present embodiment, as the spring members 511, 512, 513, the reaction force generation mechanism 50 includes a first spring member 511 that is a leaf spring, a second spring member 512 that is a compression coil spring, and a third spring member 513 that is a compression coil spring One end of the first spring member 511 is fixed to the housing body 11 by a screw or the like and the reaction force generation mechanism 50 is thereby supported in the housing 10.

Figure 4:
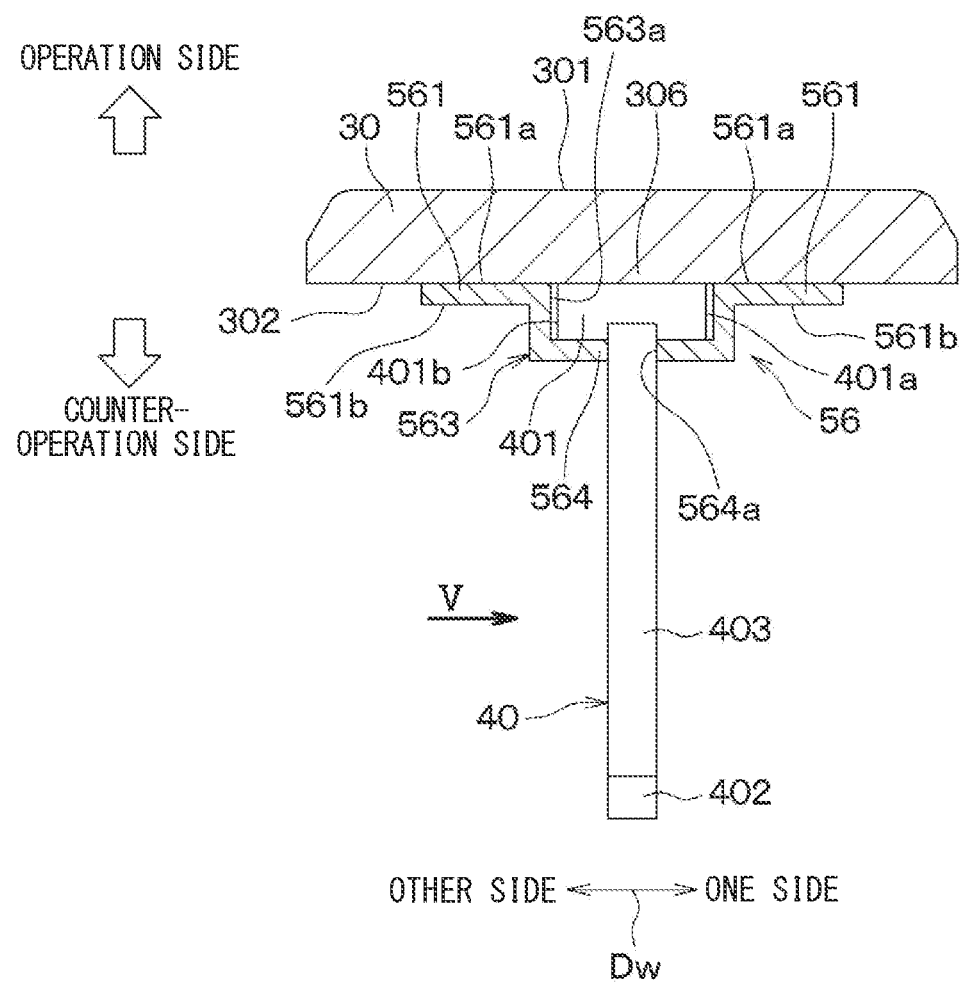
FIG. 4 is a sectional view schematically showing a section taken along line IV-IV of FIG. 3.
Figure 5:
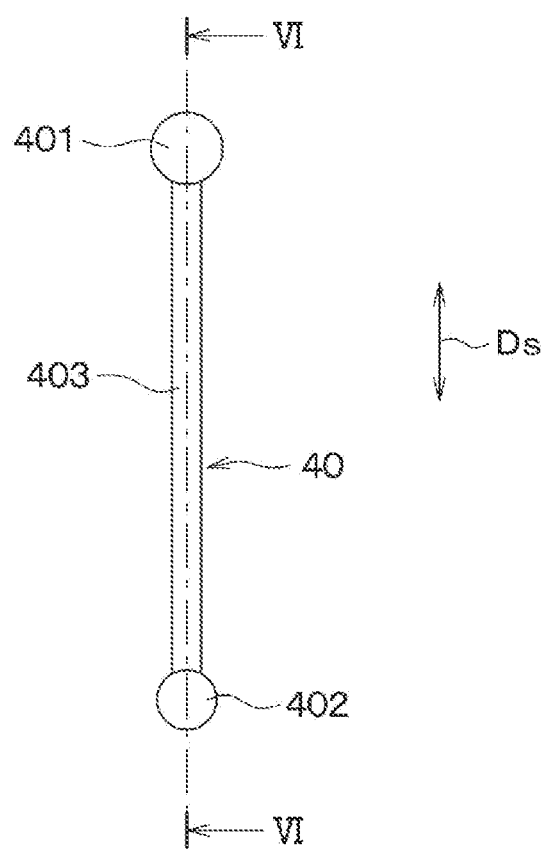
FIG. 5 is an arrow view taken in a direction of V of FIG. 4, illustrating an arm as a single component.

As shown in FIG. 3 to FIG. 5, the arm 40 is provided between the pedal pad 30 and the reaction force generation mechanism 50 and functions as a connection link connecting the pedal pad 30 and the reaction force generation mechanism 50 with each other. The arm 40 transmits stepping force applied to the pedal pad 30 by an operator 81 to the reaction force generation mechanism 50. In other words, the arm 40 transmits reaction force generated against stepping force of an operator 81 by the reaction force generation mechanism 50 to the pedal pad 30. That the arm 40 is provided between the pedal pad 30 and the reaction force generation mechanism 50, cited here, means that in a force transmission path, the arm 40 is provided between the pedal pad 30 and the reaction force generation mechanism 50.

The arm 40 includes an arm one end 401, an arm other end 402, and an arm body 403. Though FIG. 4 is a sectional view, the figure does not show a section of the arm 40 for the sake of visibility of the illustration.

The arm one end 401 is provided on the operation side of the arm 40 and the arm other end 402 is provided on the counter-operation side of the arm 40. The arm body 403 is provided between the arm one end 401 and the arm other end 402 and connects the arm one end 401 and the arm other end 402 with each other. That is, the arm body 403 is so formed as to extend from the arm one end 401 to the counter-operation side. In other words, the arm body 403 is so formed as to extend from the arm one end 401 to the arm other end 402.

The arm 40 is coupled with the pedal pad 30 at the arm one end 401. Specifically, the arm 40 is coupled with the pedal back side 302 of the pedal pad 30. As shown in FIG. 3, for example, the arm 40 is so configured that the arm can be swung about the arm one end 401 relative to the pedal pad 30 as viewed in a direction along the pedal axial center CL.

Meanwhile, the arm 40 is coupled with the reaction force generation mechanism 50 at the arm other end 402. That is, the arm 40 is coupled with the reaction force generation mechanism 50 on the counter-operation side. In detail, the reaction force generation mechanism 50 includes an arm receiving portion 514 placed between the spring members 511, 512, 513 and the arm 40 and the arm other end 402 is fit into a recess formed in the arm receiving portion 514. As shown in FIG. 3, for example, the arm 40 is so configured that the arm can be swung about the arm other end 402 relative to the arm receiving portion 514 of the reaction force generation mechanism 50 as viewed in a direction along the pedal axial center CL.

Since the arm 40 couples the pedal pad 30 and the reaction force generation mechanism 50 with each other, as mentioned above, the arm 40 is also more displaced toward the counter-operation side as the upper end 303 of the pedal pad 30 is more displaced toward the counter-operation side in conjunction with stepping operation of an operator 81. As the arm 40 is more displaced toward the counter-operation side, the spring members 511, 512, 513 of the reaction force generation mechanism 50 are more largely elastically deformed; therefore, reaction force generated against stepping force of an operator 81 by the reaction force generation mechanism 50 is increased according to the elastic deformation.

Figure 6:
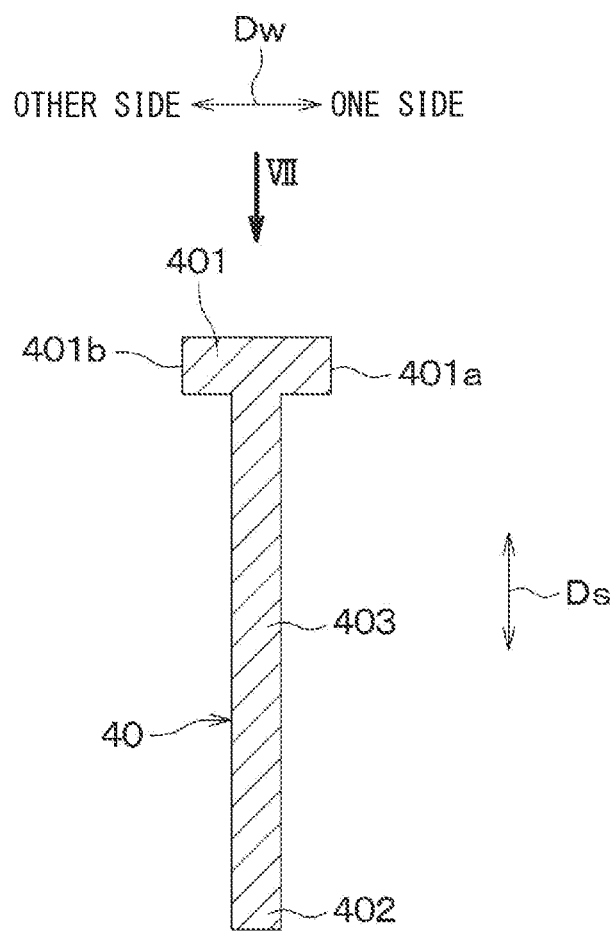
FIG. 6 is a sectional view showing a section taken along line VI-VI of FIG. 5.
Figure 7:
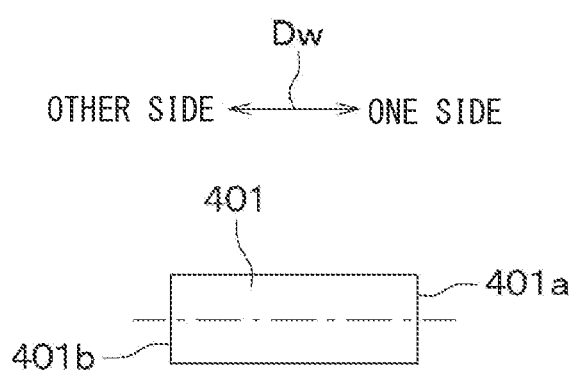
FIG. 7 is an arrow view taken in a direction of VII of FIG. 6.

A description will be given to a shape of the arm one end 401. As shown in FIG. 5 to FIG. 7, the arm one end 401 forms such a shape that the arm one end is widened from the arm body 403 to both sides in a widening direction Dw perpendicular to an extending direction Ds in which the arm body 403 is extended. In the description of the present embodiment, the extending direction Ds of the arm body 403 is also referred to as arm extending direction Ds and the widening direction Dw of the arm one end 401 is also referred to as arm end widening direction Dw.

In the present embodiment, specifically, the arm end widening direction Dw is identical with a direction along the pedal axial center CL, that is, the axial direction of the pedal axial center CL. The arm one end 401 forms a shape of a column having an axial center parallel with the pedal axial center CL. Therefore, as viewed in a direction along the arm end widening direction Dw (for example, as viewed in a direction along arrow V of FIG. 4), the arm one end 401 forms a circular shape as shown in FIG. 5.

As shown in FIG. 4 to FIG. 7, the arm one end 401 includes a widening-direction one end 401a provided on one side in the arm end widening direction Dw and a widening-direction other end 401b provided on the other side in the arm end widening direction Dw. For example, the widening-direction one end 401a is an end face of the columnar shape of the arm one end 401 provided on one side in the arm end widening direction Dw and the widening-direction other end 401b is an end face of the columnar shape of the arm one end 401 provided on the other side in the arm end widening direction Dw.

As shown in FIG. 3 and FIG. 4, the stopper part 56 is configured as a component separate from the pedal pad 30 and is joined and fixed to the pedal pad 30. The stopper part 56 in the present embodiment is formed of metal and is joined to the pedal pad 30, for example, by welding. The stopper part 56 is fixed to the pedal pad 30 and thereby maintains the arm 40 in coupling with the pedal pad 30. In the present embodiment, the stopper part 56 is equivalent to one part that is one of the pedal pad 30 and the stopper part 56 and the pedal pad 30 is equivalent to the other part that is the other of the pedal pad 30 and the stopper part 56.

Figure 8:
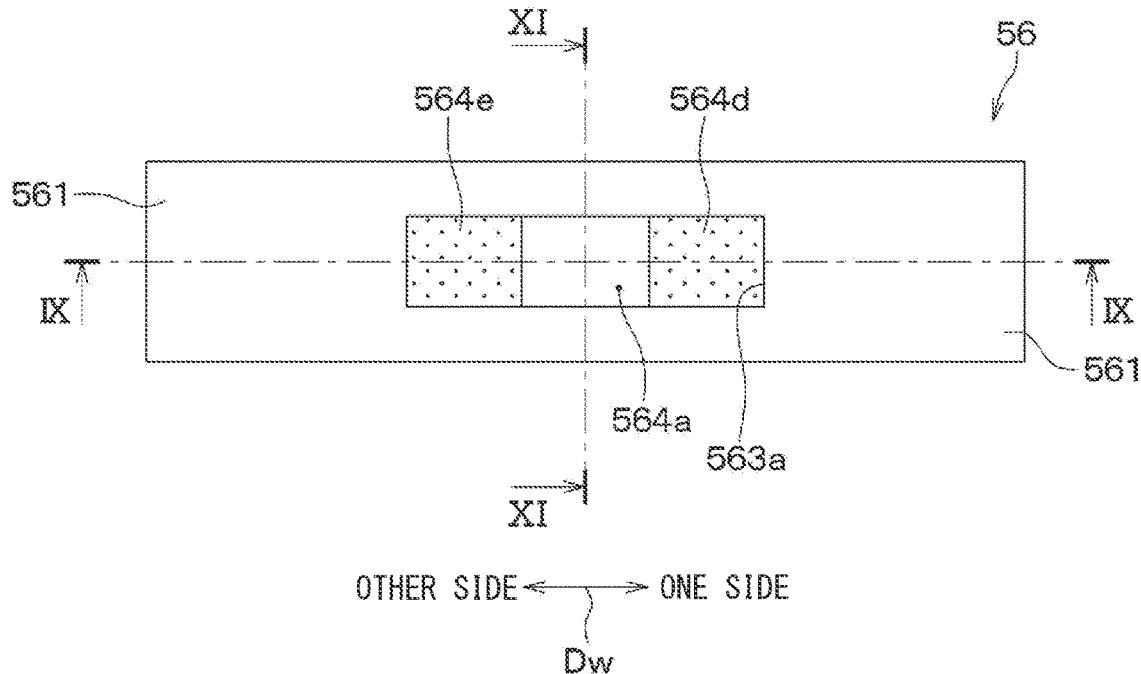
FIG. 8 is a plan view illustrating a stopper part as a single component in the first embodiment, as viewed in a direction going from the operation side toward the counter-operation side.
Figure 9:
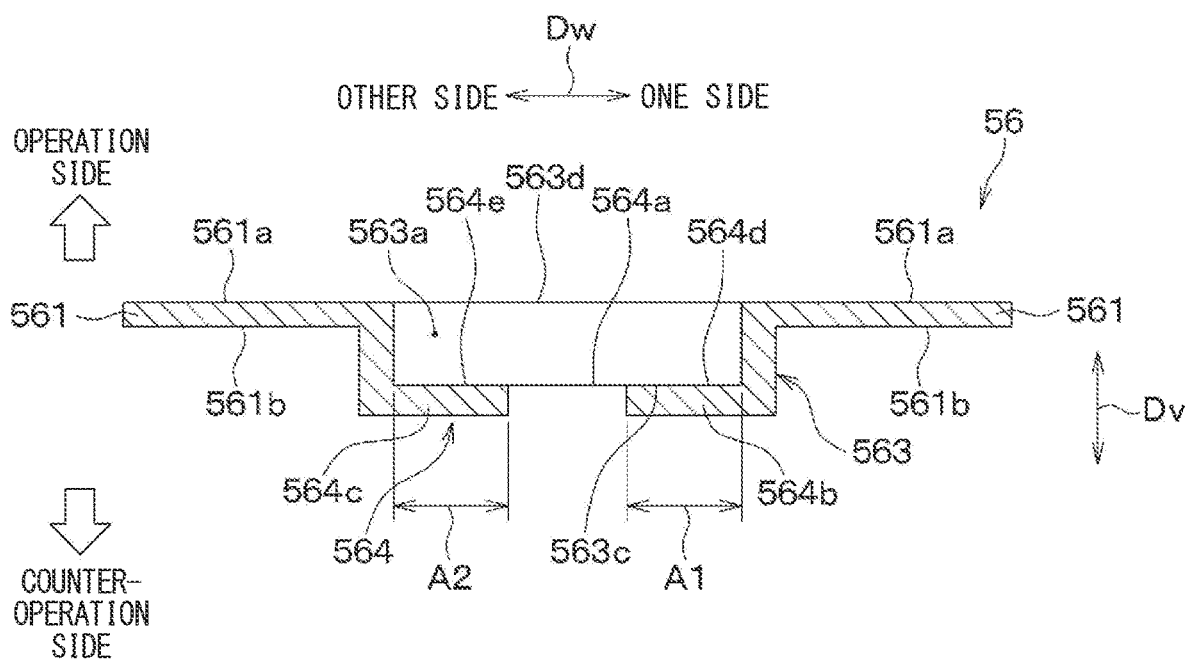
FIG. 9 is a sectional view showing a section taken along line IX-IX of FIG. 8.

As shown in FIG. 4, FIG. 8, and FIG. 9, the stopper part 56 includes a base portion 561 and a protruded portion 563. The base portion 561 is widened from the protruded portion 563 to both the one side and the other side in the arm end widening direction Dw.

Figure 10:
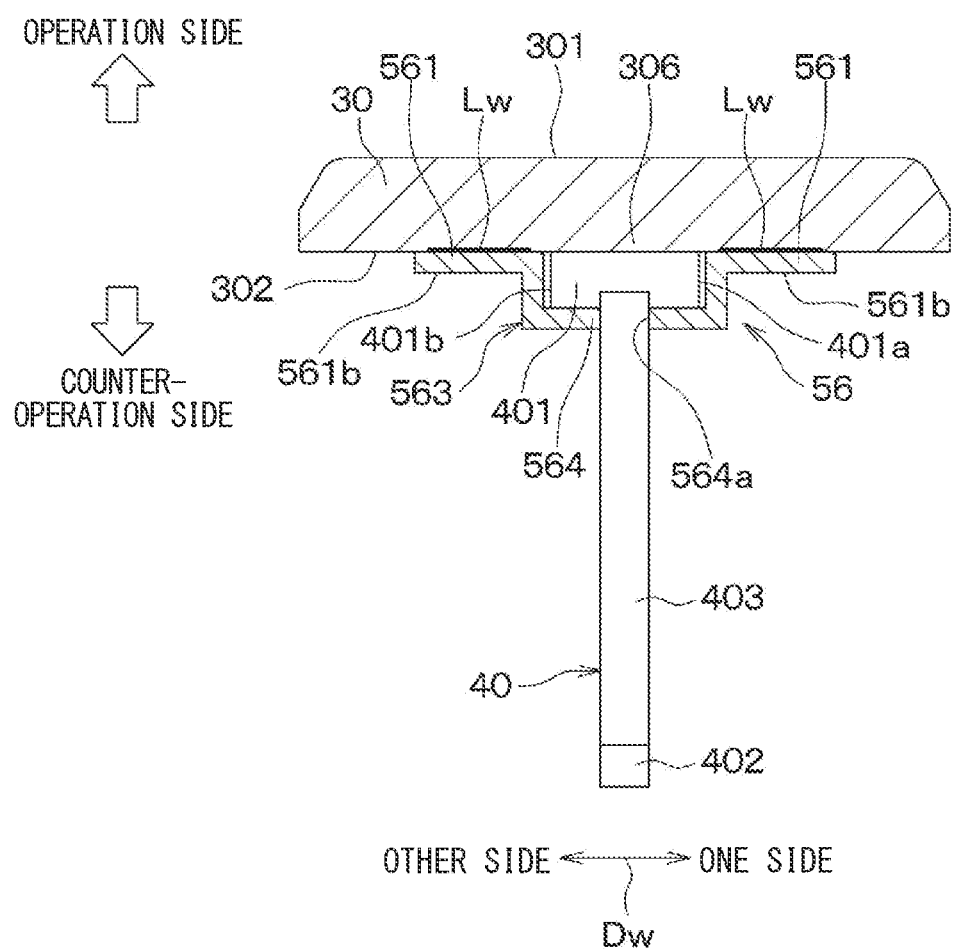
FIG. 10 is a sectional view showing the same section as in FIG. 4, indicating a point of welding between a stopper part and a pedal pad.

The base portion 561 has on the operation side a joining surface 561a opposed to the pedal back side 302 and the joining surface 561a and the pedal back side 302 are fixed to each other by welding. That is, the stopper part 56 and the pedal pad 30 are joined to each other by welding together the base portion 561 as a metal part and a metal part of the pedal pad 30 forming the pedal back side 302. A point of welding between the stopper part 56 and the pedal pad 30 is provided on both one side and the other side in the arm end widening direction Dw relative to the protruded portion 563. FIG. 10 is a sectional view similar to FIG. 4 and in FIG. 10, a point of welding between the stopper part 56 and the pedal pad 30 is indicated by a thick solid line Lw.

As shown in FIG. 4, FIG. 8, and FIG. 9, the base portion 561 has a base surface 561b provided on the opposite side to the joining surface 561a and facing to the counter-operation side and the protruded portion 563 is protruded from the base surface 561b in the normal line direction DV of the base surface 561b.

As shown in FIG. 4, FIG. 8, FIG. 9, and FIG. 11, a housing space 563a accommodating the arm one end 401 is formed inside the protruded portion 563. That is, the protruded portion 563 is a housing portion that accommodates the arm one end 401. The protruded portion 563 has at the top of the protruded shape thereof a first arrangement section 564 located on the counter-operation side relative to the arm one end 401 in the housing space 563a. An insertion hole 564a connecting to the housing space 563a and having the arm body 403 inserted thereinto is formed in the first arrangement section 564. In the normal line direction Dv of the base surface 561b (Refer to FIG. 9), the housing space 563a is so provided as to reach the counter-operation side beyond the base surface 561b.

The housing space 563a formed in the stopper part 56 will be described in other words; in the stopper part 56, the housing space 563a is so formed as to be recessed from the operation side to the counter-operation side so that the arm one end 401 is accommodated. The housing space 563a connects to the insertion hole 564a at the bottom 563c of the housing space 563a. Meanwhile, the housing space 563a has a housing space opening 563d open to the opposite side to the insertion hole 564a side (that is, the operation side). The housing space opening 563d is covered with a second arrangement section 306 provided in the pedal pad 30. The second arrangement section 306 is a portion of the pedal pad 30 located on the operation side of the first arrangement section 564 with the arm one end 401 in between.

Since the first arrangement section 564 and the second arrangement section 306 are located as mentioned above, the first arrangement section 564 and the second arrangement section 306 hold the arm one end 401 against the pedal pad 30 with the arm one end 401 interposed between the first arrangement section 564 and the second arrangement section 306.

In detail, the first arrangement section 564 includes one side receiving portion 564b located on one side of the insertion hole 564a in the arm end widening direction Dw and other side receiving portion 564c located on the other side of the insertion hole 564a in the arm end widening direction Dw. The first arrangement section 564 and the second arrangement section 306 hold the arm one end 401 against the pedal pad 30 with the arm one end 401 interposed between the one side receiving portion 564b and the second arrangement section 306 and between the other side receiving portion 564c and the second arrangement section 306.

The one side receiving portion 564b has one-side receiving surface 564d oriented to the operation side and facing to the housing space 563a and the other side receiving portion 564c has other-side receiving surface 564e oriented to the operation side and facing to the housing space 563a. The one-side receiving surface 564d is located on one side of the insertion hole 564a in the arm end widening direction Dw and the other-side receiving surface 564e is located on the other side of the insertion hole 564a in the arm end widening direction Dw. Each of the one-side receiving surface 564d and the other-side receiving surface 564e may be in a flat shape or in a shape of a recess whose radius of curvature is larger than a radius of the columnar shape of the arm one end 401 and curved and recessed toward the counter-operation side in a section perpendicular to the arm end widening direction Dw.

Figure 11:
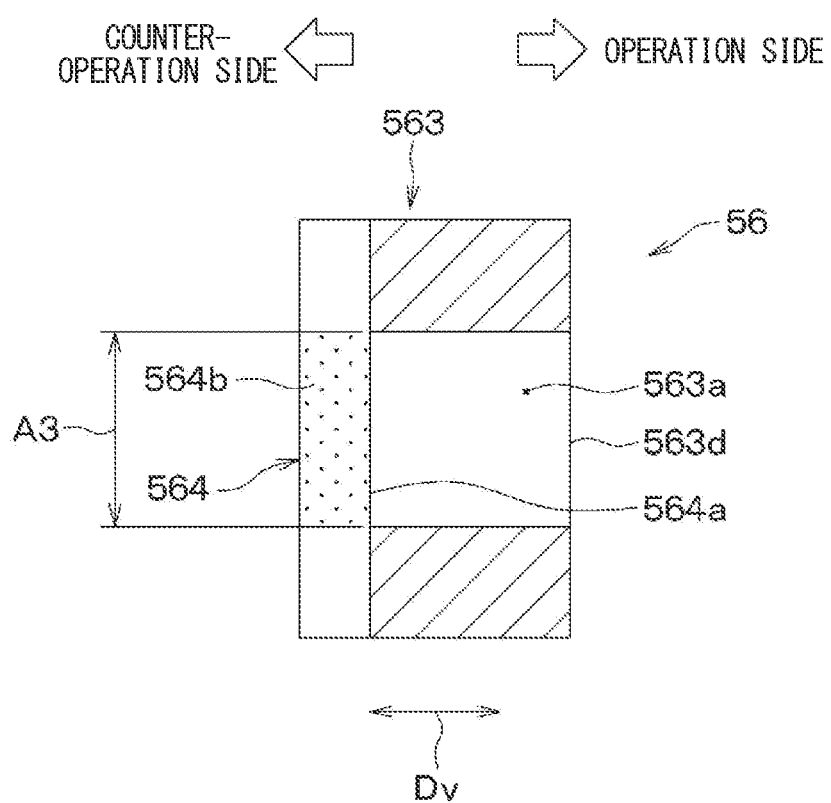
FIG. 11 is a sectional view showing a section taken along line XI-XI of FIG. 8.

In FIG. 8, the one-side receiving surface 564d and the other-side receiving surface 564e are hatched with dots and in FIG. 9, the one side receiving portion 564b is indicated by arrow A1 and the other side receiving portion is indicated by arrow A2. In FIG. 11, the one side receiving portion 564b is indicated by arrow A3 and hatched with dots.

Figure 12:
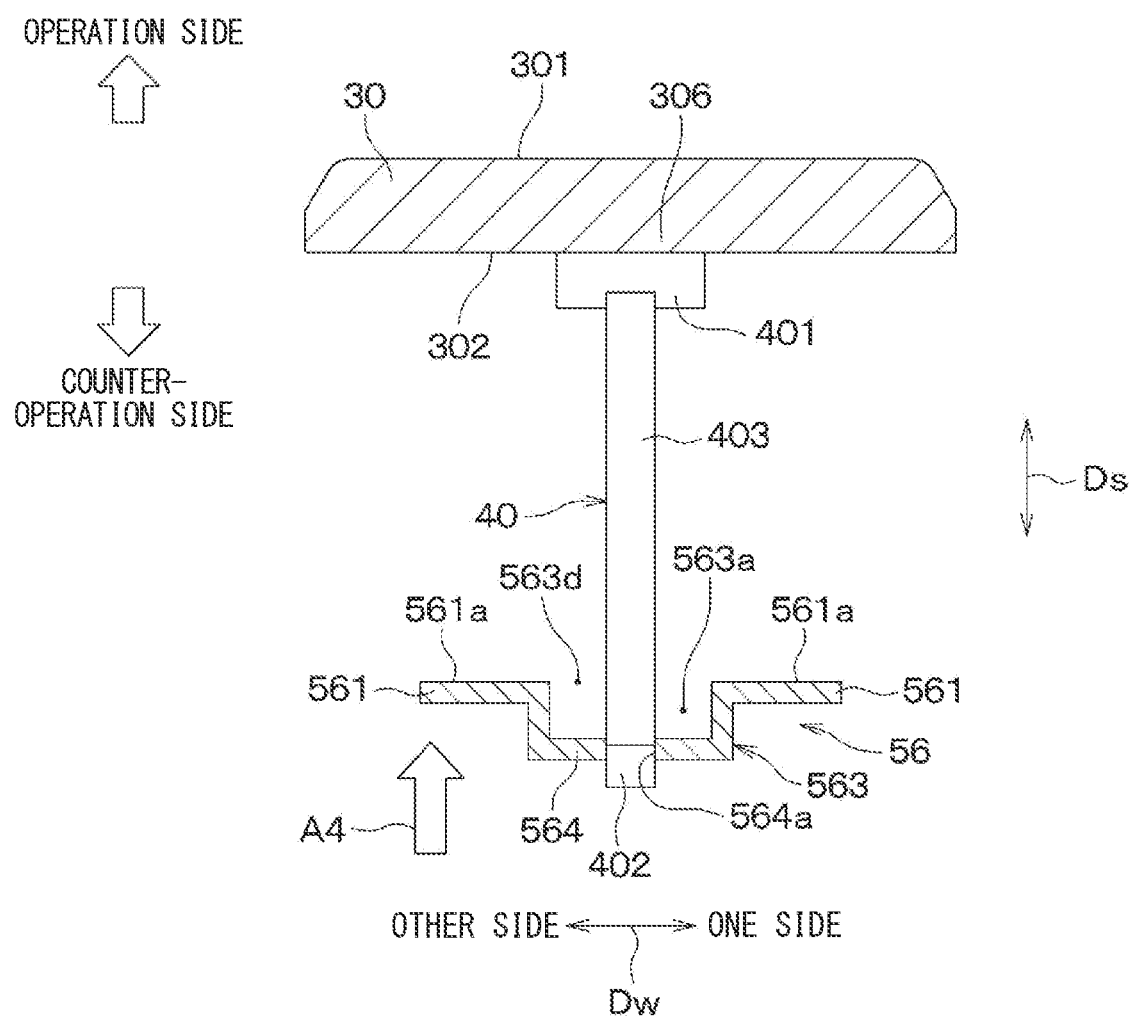
FIG. 12 is a sectional view showing a dismantled stopper part and pedal pad in the same section as in FIG. 4, illustrating how to attach an arm and the stopper part to the pedal pad.

FIG. 12 illustrates how to attach the above-mentioned arm 40 and stopper part 56 to the pedal pad 30. As shown in FIG. 12, first, the pedal pad 30 is prepared and simultaneously, the arm 40 and the stopper part 56 are respectively prepared as a single component.

Subsequently, the arm 40 is inserted into the insertion hole 564a in the first arrangement section 564 included in the stopper part 56. Specifically, the arm other end 402 of the arm 40 is inserted into the insertion hole 564a from the housing space opening 563d side and subsequently, the arm body 403 is inserted into the insertion hole 364a. Simultaneously, the stopper part 56 is brought close to the pedal pad 30 in a position in which the joining surface 561a is opposed to the pedal back side 302, as indicated by arrow A4.

The arm one end 401 is accommodated in the housing space 563a of the stopper part 56 and simultaneously, the joining surface 561a of the stopper part 56 is brought into contact with the pedal back side 302; thereafter, the joining surface 561a and the pedal bask side 302 are joined to each other by welding.

The arm 40 and the stopper part 56 are attached to the pedal pad 30 as mentioned above. For this reason, as shown in FIG. 4, the insertion hole 564a of the first arrangement section 564 is in such a size that an entirety of a portion of the arm 40 provided on the counter-operation side of the arm one end 401 in the arm extending direction Ds can pass and the arm one end 401 cannot pass. All the parts of the arm 40 provided on the counter-operation side of the arm one end 401 in the arm extending direction Ds are specifically the arm body 403 and the arm other end 402. The arm one end 401 is not included in an entirety of a portion of the arm 40 provided on the counter-operation side of the arm one end 401 in the arm extending direction Ds.

As shown in FIG. 4 and FIG. 9, as a single component, the stopper part 56 forms such a shape that the operation side relative to the arm one end 401 is open so that the arm one end 401 can move from a position between the first arrangement section 564 and the second arrangement section 306 to the operation side. In short, the housing space opening 563d of the stopper part 56 is in a size sufficient for the arm one end 401 to pass.

Subsequently, a description will be given to the action of the above-mentioned pedal device 1. As shown in FIG. 1 to FIG. 3, when an operator 81 steps on the pedal pad 30 and stepping force of the operator 81 is thereby applied to the stepping surface 301a, the pedal pad 30 is rotated about the pedal axial center CL to move the upper end 302 to the counter-operation side. At this time, as shown in FIG. 3 and FIG. 4, the second arrangement section 306 of the pedal pad 30 pushes the arm one end 401 to the counter-operation side; therefore, a rotation angle of the pedal pad 30 is transmitted as a displacement corresponding to the rotation angle to the reaction force generation mechanism 50 via the arm 40.

For this reason, as the pedal pad 30 is more rotated about the pedal axial center CL to move the upper end 303 to the counter-operation side, the spring members 511, 512, 513 of the reaction force generation mechanism 50 are more largely elastically deformed. As a result, as a rotation angle of the pedal pad 30 from the minimum rotational position is more increased by stepping operation of an operator 81, reaction force generated against the stepping force of the operator 81 by the reaction force generation mechanism 50 is more increased.

The above-mentioned pedal device 1 in the present embodiment brings about the following working-effects:

According to the present embodiment, as shown in FIG. 3 and FIG. 4, the stopper part 56 is configured as a component separate from the pedal pad 30 and is fixed to the pedal pad 30. The first arrangement section 564 provided in the stopper part 56 and the second arrangement section 306 provided in the pedal pad 30 hold the arm one end 401 against the pedal pad 30 with the arm one end 401 interposed between the first arrangement section 564 and the second arrangement section 306.

Therefore, since the first arrangement section 564 and the second arrangement section 306 respectively belong to different parts, when external force is applied in such a direction that the arm one end 401 pushes the first arrangement section 564, a width sufficient for the first arrangement section 564 to receive the arm one end 401 against the external force can be ensured. For this reason, the arm 40 can be coupled with the pedal pad 30 with sufficient strength. That is, the arm 40 always follows rotational movement of the pedal pad 30 without departing from the pedal pad 30; therefore, the reliability of the pedal device 1 can be enhanced.

The above-mentioned width for the first arrangement section 564 to receive the arm one end against external force is, for example, a width of the one side receiving portion 564b and a width of the other side receiving portion 564c and widths indicated by arrow A1 and arrow A2 in FIG. 9.

(1) According to the present embodiment, as shown in FIG. 12, the insertion hole 564a of the stopper part 56 is in such a size that an entirety of a portion of the arm 40 provided on the counter-operation side of the arm one end 401 in the arm extending direction Dx can pass and the arm one end 401 cannot pass. As a single component, the stopper part 56 is in such a shape that the operation side relative to the arm one end 401 is open so that the arm one end 401 can be moved from a position between the first arrangement section 564 and the second arrangement section 306 to the operation side. In other words, the housing space opening 563d of the stopper part 56 is in a size sufficient for the arm one end 401 to pass.

Therefore, when the arm 40 and the stopper part 56 are attached to the pedal pad 30, as shown in FIG. 12, the arm 40 can be inserted into the insertion hole 564a of the stopper part 56 from the operation side relative to the stopper part 56. For this reason, a width of the one side receiving portion 564b, indicated by arrow A1 in FIG. 9, and a width of the other side receiving portion 564c, indicated by arrow A2 can be sized sufficiently to prevent a fall of the arm one end 401. Since the arm 40 can be prevented from departing from the pedal pad 30 due to, for example, elastic deformation of the one side receiving portion 564b and the other side receiving portion 564c, the reliability of the pedal device 1 can be enhanced.

(2) According to the present embodiment, the stopper part 56 shown in FIG. 4 is formed of metal; therefore, the first arrangement section 564 constituting a part of the stopper part 56 is also formed of metal. Therefore, the rigidity of the first arrangement section 564 for holding the arm one end 401 in the housing space 563a can be enhanced and thus, falling-out of the arm 40 due to elastic deformation of the first arrangement section 564 can be prevented to enhance the reliability of the pedal device 1.

(3) According to the present embodiment, as shown in FIG. 10, the pedal pad 30 and the stopper part 56 respectively have a metal part and are joined to each other by welding the metal parts together. For this reason, the arm 40 and the stopper part 56 can be easily assembled to the pedal pad 30. The stopper part 56 can be fixed to the pedal pad 30 without necessity for a protrusion or the like being protruded from the pedal front side 301.

(4) According to the present embodiment, as shown in FIG. 1, the pedal device 1 is provided in a vehicle 80 as a brake pedal device for performing braking operation to apply brake to the vehicle 80. Therefore, the high reliability of the pedal device 1 owing to the arm 40 being prevented from departing from the pedal pad 30 can be sufficiently utilized in the vehicle 80.

(5) According to the present embodiment, as shown in FIG. 4 to FIG. 7, the arm end widening direction Dw is a direction along the pedal axial center LC (Refer to FIG. 3). As viewed in a direction along the arm end widening direction Dw (for example, as viewed in a direction along arrow V of FIG. 4), the arm one end 401 is formed in a circular shape. Therefore, as viewed in a direction along the pedal axial center CL, the arm 40 can be swung around the arm one end 401 relative to the pedal pad 30.

Second Embodiment

A description will be given to a second embodiment. With respect to the present embodiment, a description will be given mainly to a difference from the first embodiment. With respect to an element identical with or similar to one in the above-mentioned embodiment, a description will be omitted or simplified. This is also the case with respect to the embodiments described below. In drawings referred to in relation to the second and following embodiments, each configuration element of the pedal device 1 will be simplified as required.

Figure 13:
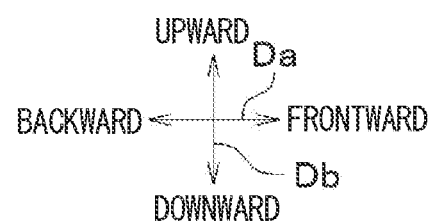
FIG. 13 is a drawing schematically showing a pedal device as viewed in a direction along a pedal axial center in a second embodiment.
Figure 13:
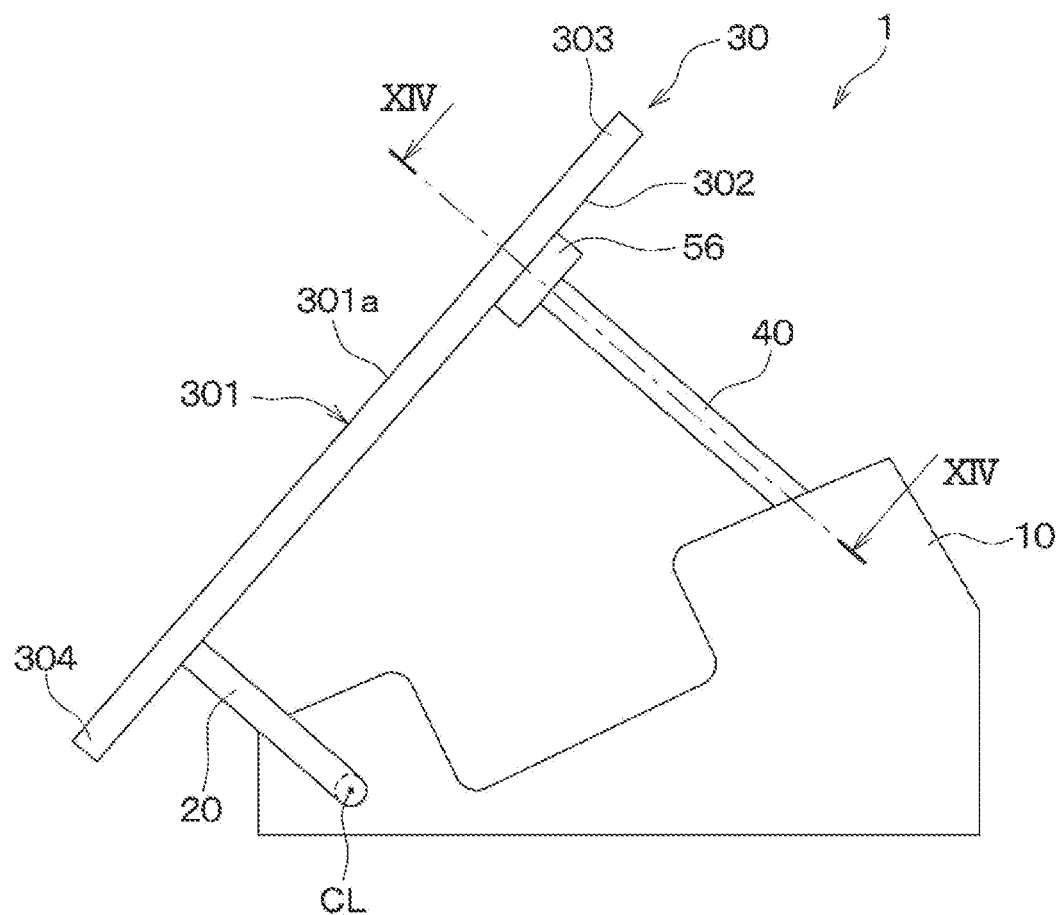

As shown in FIG. 13, in the present embodiment, the pedal pad 30 is configured with an equal thickness throughout the pedal pad. For this reason, the whole of the pedal front side 301 of the pedal pad 30 functions as a stepping surface 301a.

The present embodiment is identical with the first embodiment except the foregoing. In the present embodiment, the effects brought about by configuration elements common to those in the first embodiment can be obtained as in the first embodiment.

Third Embodiment

A description will be given to a third embodiment. With respect to the present embodiment, a description will be given mainly to a difference from the second embodiment.

Figure 14:
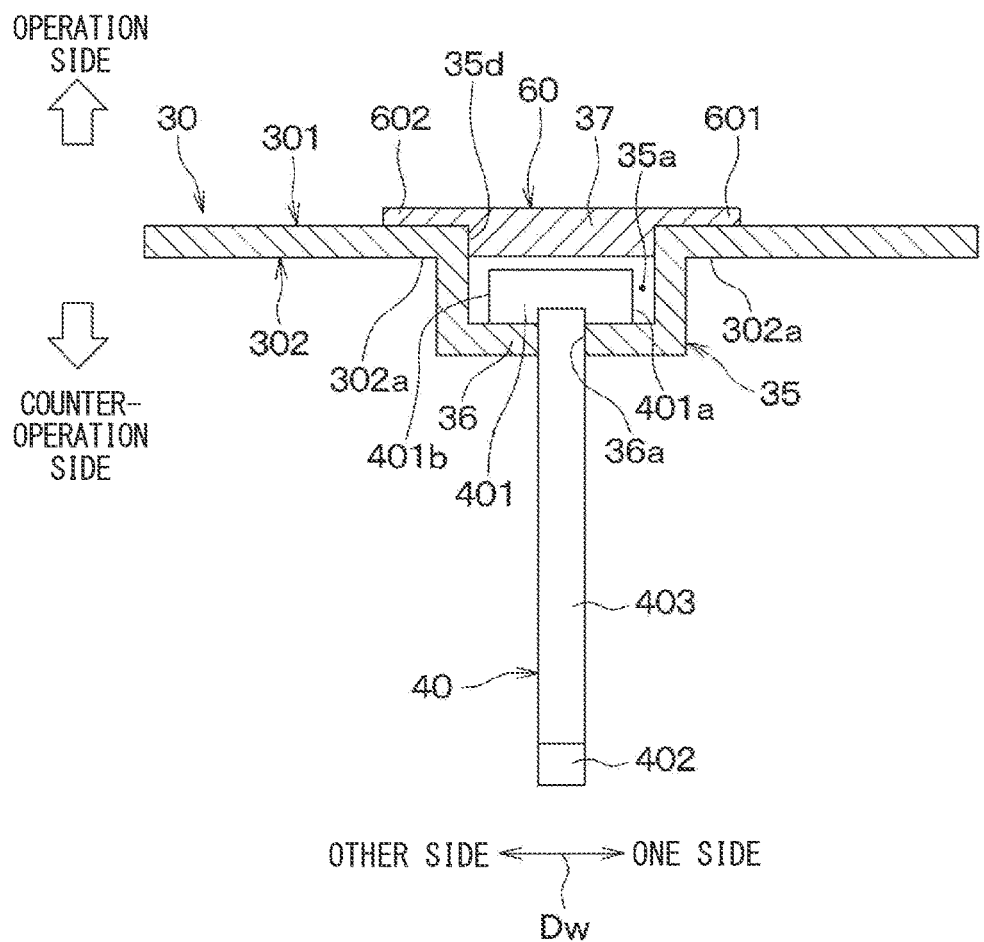
FIG. 14 is a sectional view showing a section (specifically, a section equivalent to a section taken along line XIV-XIV of FIG. 13) along an arm extending direction in a third embodiment, equivalent to FIG. 4.
Figure 15:
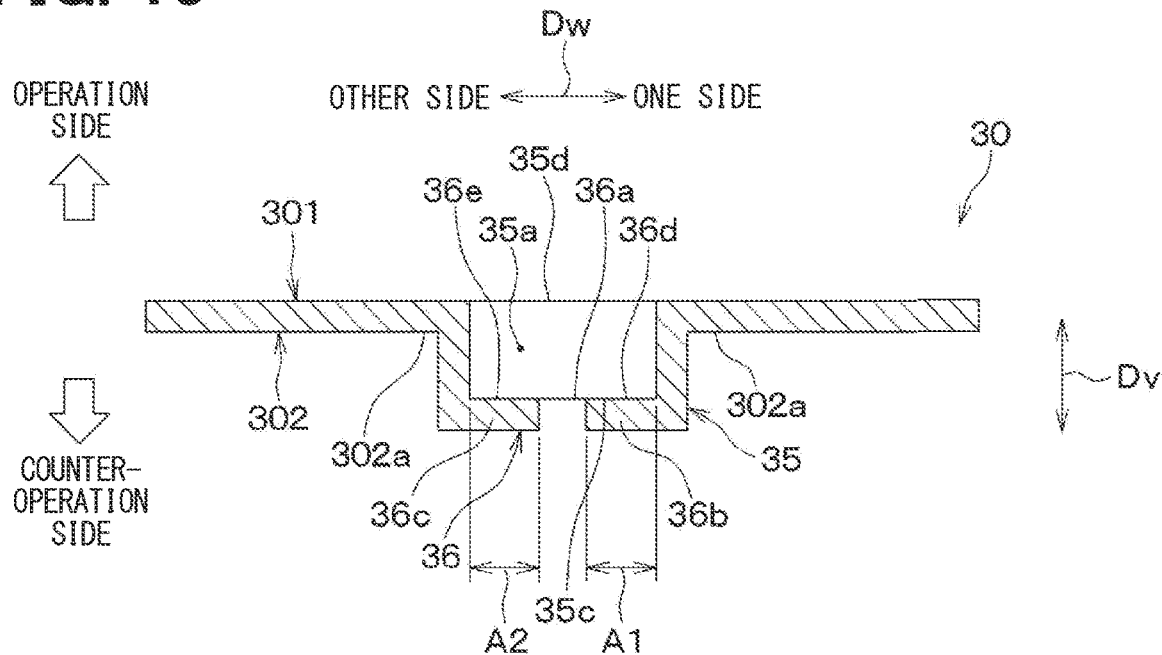
FIG. 15 is a sectional view showing a section obtained by cutting a pedal pad as a single component as in FIG. 9 in the third embodiment.

As shown in FIG. 14 and FIG. 15, in the present embodiment, the pedal device 1 is not provided with the stopper part 56 in FIG. 4. Instead, in the present embodiment, the pedal device 1 is provided with a stopper part 60 and the pedal pad 30 includes a protruded portion 35 in place of the protruded portion 563 (Refer to FIG. 4) in the second embodiment.

The protruded portion 35 in the present embodiment corresponds to the protruded portion 563 in the second embodiment. That is, the protruded portion 35 in the present embodiment is different from the protruded portion 563 in the second embodiment in that the relevant protruded portion constitutes a part of the pedal pad 30 but is configured similarly to the protruded portion 563 in the second embodiment in the other respects.

Specifically, as shown in FIG. 15 and FIG. 9, a housing space 35a in the present embodiment is similar to the housing space 563a in the second embodiment and the bottom 35c of the housing space 35a in the present embodiment is similar to the bottom 563c of the housing space 563a in the second embodiment. A housing space opening 35d in the present embodiment is similar to the housing space opening 563d in the second embodiment and a first arrangement section 36 in the present embodiment is similar to the first arrangement section 564 in the second embodiment. An insertion hole 36a of the first arrangement section 36 in the present embodiment is similar to the insertion hole 564a of the first arrangement section 564 in the second embodiment. One side receiving portion 36b of the first arrangement section 36 in the present embodiment is similar to the one side receiving portion 564b of the first arrangement section 564 in the second embodiment and other side receiving portion 36c of the first arrangement section 36 in the present embodiment is similar to the other side receiving portion 564c of the first arrangement section 564 in the second embodiment. One side receiving surface 36d of the first arrangement section 36 in the present embodiment is similar to the one-side receiving surface 564d of the first arrangement section 564 in the second embodiment and other-side receiving surface 36e of the first arrangement section 36 in the present embodiment is similar to the other-side receiving surface 564e of the first arrangement section 564 in the second embodiment. Also, in FIG. 15, as in FIG. 9, the one side receiving portion 36b of the first arrangement section 36 is indicated by arrow A1 and the other side receiving portion 36c of the first arrangement section 36 is indicated by arrow A2.

Therefore, the individual configuration elements included in the protruded portion 35 in the present embodiment respectively correspond to the individual configuration elements included in the protruded portion 563 in the second embodiment. The pedal pad 30 in the present embodiment includes the first arrangement section 564 included in the protruded portion 35. In the present embodiment, the pedal pad 30 is equivalent to one part having the first arrangement section 564.

The protruded portion 35 of the pedal pad 30 in the present embodiment is protruded from a base surface 302a as a part of the pedal back side 302 in the normal line direction Dv of the base surface 302a. The base surface 302a in the present embodiment is a portion of the pedal back side 302 provided around the protruded portion 35. The base surface 302a in the present embodiment corresponds to the base surface 561b in the second embodiment and is similar to the base surface 561b except that the relevant base surface constitutes a part of the pedal pad 30.

As shown in FIG. 14 and FIG. 15, the stopper part 60 is formed of, for example, metal and includes a second arrangement section 37, one side joining portion 601, and other side joining portion 602. In the present embodiment, the stopper part 60 is equivalent to other part having the second arrangement section 37.

The second arrangement section 37 in the present embodiment corresponds to the second arrangement section 306 in the second embodiment. That is, the second arrangement section 37 in the present embodiment is different from the second arrangement section 306 in the second embodiment in that the relevant second arrangement section constitutes a part of the stopper part 60 but is similar to the second arrangement section 306 in the second embodiment in the other respects. For example, the second arrangement section 37 in the present embodiment is located on the operation side of the first arrangement section 36 with the arm one end 401 in between.

Figure 16:
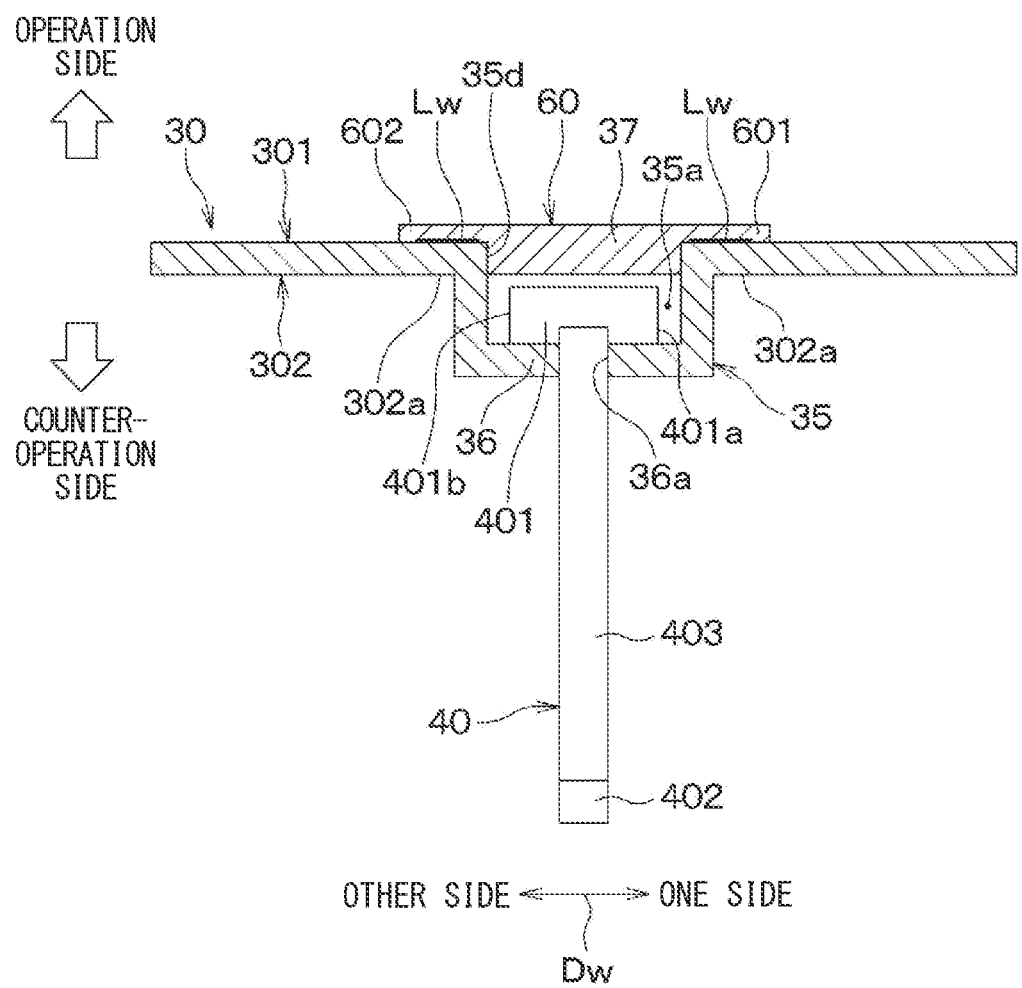
FIG. 16 is a sectional view showing the same section as in FIG. 4, indicating a point of welding between a stopper part and a pedal pad.

One side joining portion 601 of the stopper part 60 is located on one side of the second arrangement section 37 in the arm end widening direction Dw. Other side joining portion 602 is located on the other side of the second arrangement section 37 in the arm end widening direction Dw. The one side joining portion 601 and the other side joining portion 602 are in contact with the pedal front side 301. In addition thereto, the one side joining portion 601 and the other side joining portion 602 are joined to the pedal front side 301 by, for example, welding. That is, the pedal pad 30 and the stopper part 60 are joined to each other by welding together a metal part forming the pedal front side 301 and the one side and other side joining portions 601, 602 as metal parts. FIG. 16 is a sectional view similar to FIG. 14 and in FIG. 16, a point of welding between the stopper part 60 and the pedal pad 30 is indicated by a thick solid line LW.

Figure 17:
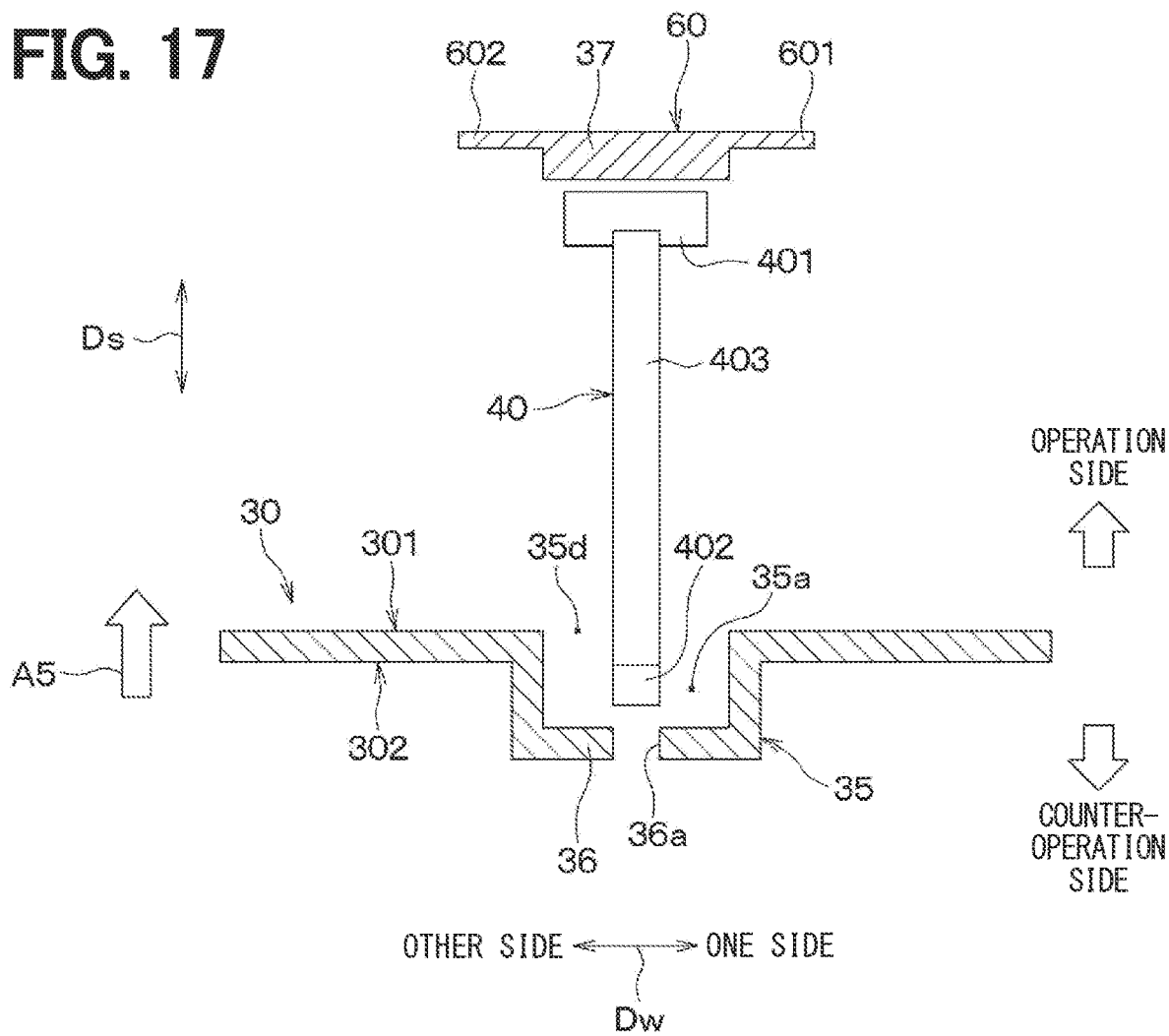
FIG. 17 is a sectional view showing a dismantled arm, stopper part, and pedal pad in the same section as in FIG. 14, illustrating how to attach the arm and the stopper part to the pedal pad.

FIG. 17 illustrates how to attach the above-mentioned stopper part 60 and arm 40 to the pedal pad 30. As shown in FIG. 17, first, the pedal pad is prepared and simultaneously, the arm 40 and the stopper part 60 are respectively prepared as a single component.

Subsequently, the arm 40 is brought into a position in which the arm one end 401 side is oriented to the operation side and then the arm 40 is inserted into the insertion hole 36a of the first arrangement section 36. Specifically, the arm other end 402 of the arm 40 is inserted into the insertion hole 36a from the housing space opening 35d side and subsequently, the arm body 403 is inserted into the insertion hole 36a. Simultaneously, the stopper part 60 is brought into a position in which a face thereof on the side to be joined to the pedal front side 301 is opposed to the pedal front side 301 and the pedal pad 30 and the stopper part 60 are brought close to each other as indicated by arrow A5.

The arm one end 401 is accommodated in the housing space 35a of the pedal pad 30 and simultaneously, the one side and other side joining portions 601, 602 of the stopper part 60 are brought into contact with the pedal front side 301. After the pedal pad 30, arm 40, and stopper part 60 are brought into such a state, each of the one side and other side joining portions 601, 602 of the stopper part 60 is joined to the pedal front side 301 by welding.

The stopper part 60 and the arm 40 are attached to the pedal pad 30 as mentioned above. For this reason, each of the size relation between the insertion hole 36a of the first arrangement section 36 and the arm one end 401 and the size relation between the housing space opening 35d and the arm one end 401 is the same as in the second embodiment.

Specifically, as shown in FIG. 14, the insertion hole 36a is in such a size that an entirety of a portion of the arm 40 provided on the counter-operation side of the arm one end 401 in the arm extending direction Ds can pass and the arm one end 401 cannot pass. As shown in FIG. 14 and FIG. 15, as a single component, the pedal pad 30 is in such a shape that the operation side thereof relative to the arm one end 401 is open so that the arm one end 401 can move from a position between the first arrangement section 36 and the second arrangement section 37 to the operation side. In short, the housing space opening 35d of the pedal pad 30 is in a size sufficient for the arm one end 401 to pass.

The present embodiment is identical with the second embodiment except the foregoing. In the present embodiment, the effects brought about by configuration elements common to those in the second embodiment can be obtained as in the second embodiment. The present embodiment is a modification to the second embodiment but the present embodiment can also be combined with the first embodiment.

Fourth Embodiment

A description will be given to a fourth embodiment. With respect to the present embodiment, a description will be given mainly to a difference from the second embodiment.

Figure 18:
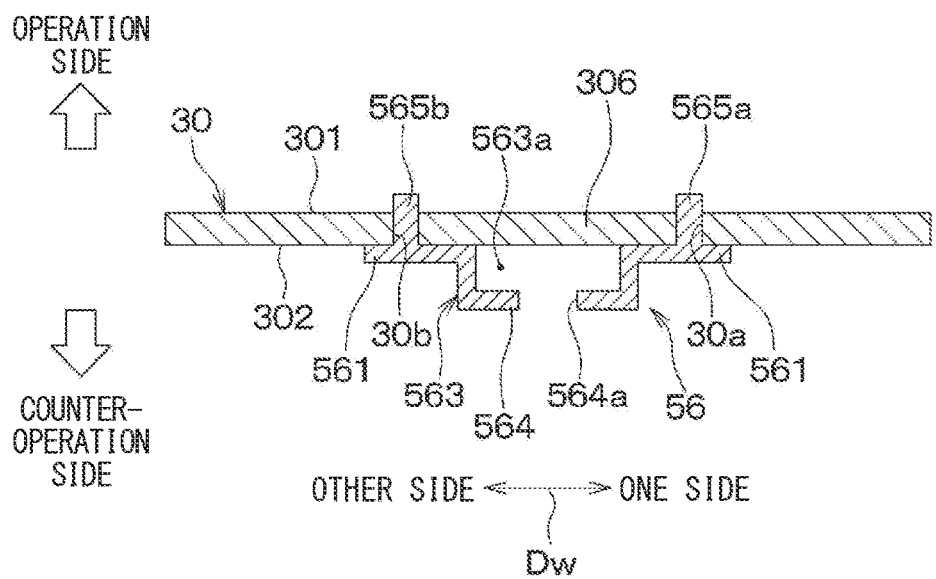
FIG. 18 is a drawing selectively showing a stopper part and a pedal pad and schematically showing the stopper part as is assembled to the pedal pad in a fourth embodiment, equivalent to FIG. 10.

As shown in FIG. 18, the present embodiment adopts press fitting of bosses 565a, 565b instead of welding to join the pedal pad 30 and the stopper part 56 to each other.

Specifically, the stopper part 56 as one part has a plurality of the bosses 565a, 565b protruded from the base portion 561 to the pedal pad 30 side. One side boss 565a, which is one of the bosses 565a, 565b, is located on one side of the protruded portion 563 in the arm end widening direction Dw. Other side boss 565b, which is the other of the bosses 565a, 565b, is located on the other side of the protruded portion 563 in the arm end widening direction Dw.

In the pedal pad 30 as other part, one side coupling hole 30a and other side coupling hole 30b penetrating the pedal pad from the pedal front side 301 to the pedal back side 302 are formed. The one side coupling hole 30a is coaxially provided with respect to the one side boss 565a and the other side coupling hole 30b is coaxially provided with respect to the other side boss 565b.

The one side boss 565a is press fit into the one side coupling hole 30a from the pedal back side 302 to the pedal front side 301 and the other side boss 565b is press fit into the other side coupling hole 30b from the pedal back side 302 to the pedal front side 301.

As mentioned above, the stopper part 56 and the pedal pad 30 are joined to each other by press fitting the one side boss 565a into the one side coupling hole 30a and press fitting the other side boss 565b into the other side coupling hole 30b.

(1) As mentioned above, according to the present embodiment, the stopper part 56 and the pedal pad 30 are joined to each other by press fitting of the bosses 565a, 565b into the coupling holes 30a, 30b. Therefore, the arm 40 and the stopper part 56 can be easily assembled to the pedal pad 30.

The present embodiment is identical with the second embodiment except the foregoing. In the present embodiment, the effects brought about by configuration elements common to those in the second embodiment can be obtained as in the second embodiment. The present embodiment is a modification to the second embodiment but the present embodiment can also be combined with the first embodiment.

Fifth Embodiment

A description will be given to a fifth embodiment. With respect to the present embodiment, a description will be given mainly to a difference from the third embodiment.

Figure 19:
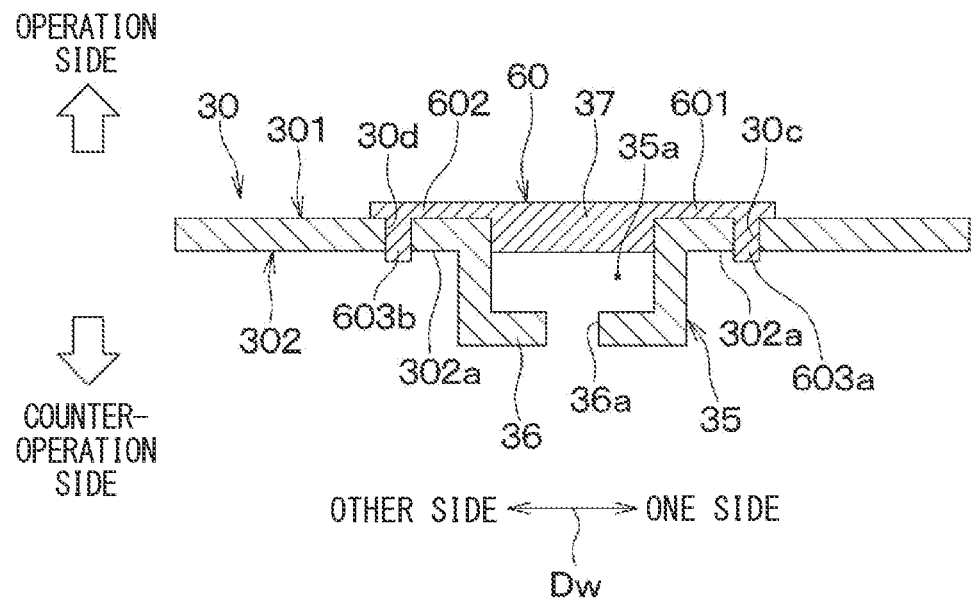
FIG. 19 is a drawing selectively showing a stopper part and a pedal pad and schematically showing the stopper part as is assembled to the pedal pad in a fifth embodiment, equivalent to FIG. 16.

As shown in FIG. 19, the present embodiment adopts press fitting instead of welding to join the pedal and 30 and the stopper part 56 to each other as in the fourth embodiment.

Specifically, the stopper part 60 as other part has one side boss 603a protruded from the one side joining portion 601 to the pedal pad 30 side and other side boss 603b protruded from the other side joining portion 602 to the pedal pad 30 side. The one side boss 603a is located on one side of the second arrangement section 37 in the arm end widening direction Dw and the other side boss 603b is located on the other side of the second arrangement section 37 in the arm end widening direction Dw.

In the pedal pad 30 as one part, one side coupling hole 30c and other side coupling hole 30d penetrating the pedal pad from the pedal front side 301 to the pedal back side 302 are formed. The one side coupling hole 30c is coaxially provided with respect to the one side boss 603a and the other side coupling hole 30d is coaxially provided with respect to the other side boss 603b.

The one side boss 603a is press fit into the one side coupling hole 30c from the pedal front side 301 to the pedal back side 302 and the other side boss 603b is press fit into the other side coupling hole 30d from the pedal front side 301 to the pedal back side 302.

As mentioned above, the stopper part 60 and the pedal pad 30 are joined to each other by press fitting the one side boss 603a into the one side coupling hole 30c and press fitting the other side boss 603b into the other side coupling hole 30d.

(1) As mentioned above, according to the present embodiment, the stopper part 60 and the pedal pad 30 are joined to each other by press fitting as in the fourth embodiment. Therefore, the working-effects by the press fitting can be obtained as in the fourth embodiment.

The present embodiment is identical with the third embodiment except the foregoing. In the present embodiment, the effects brought about by configuration elements common to those in the third embodiment can be obtained as in the third embodiment.

Sixth Embodiment

A description will be given to a sixth embodiment. With respect to the present embodiment, a description will be given mainly to a difference from the fourth embodiment.

Figure 20:
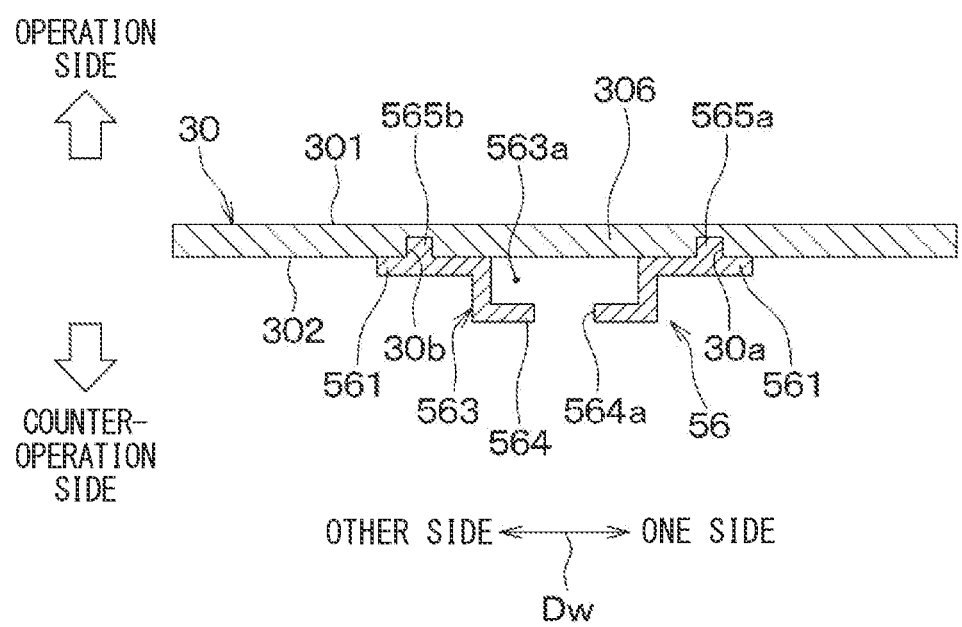
FIG. 20 is a drawing selectively showing a stopper part and a pedal pad and schematically showing the stopper part as is assembled to the pedal pad in a sixth embodiment, equivalent to FIG. 18.

As shown in FIG. 20, each of the one side coupling hole 30a and the other side coupling hole 30b of the pedal pad 30 is not a through hole but is a non-penetrating hole. That is, each of the one side coupling hole 30a and the other side coupling hole 30b is closed on the pedal front side 301.

As mentioned above, according to the present embodiment, each of the one side coupling hole 30a and the other side coupling hole 30b is a non-penetrating hole. Therefore, the stopper part 56 can be fixed to the pedal pad 30 without necessity for a protrusion or the like being produced from the pedal front side 301, which is a side of the pedal pad 30 to be stepped on by an operator 81.

The present embodiment is identical with the fourth embodiment except the foregoing. In the present embodiment, the effects brought about by configuration elements common to those in the first embodiment can be obtained as in the first embodiment.

Seventh Embodiment

A description will be given to a seventh embodiment. With respect to the present embodiment, a description will be given mainly to a difference from the fifth embodiment.

Figure 21:
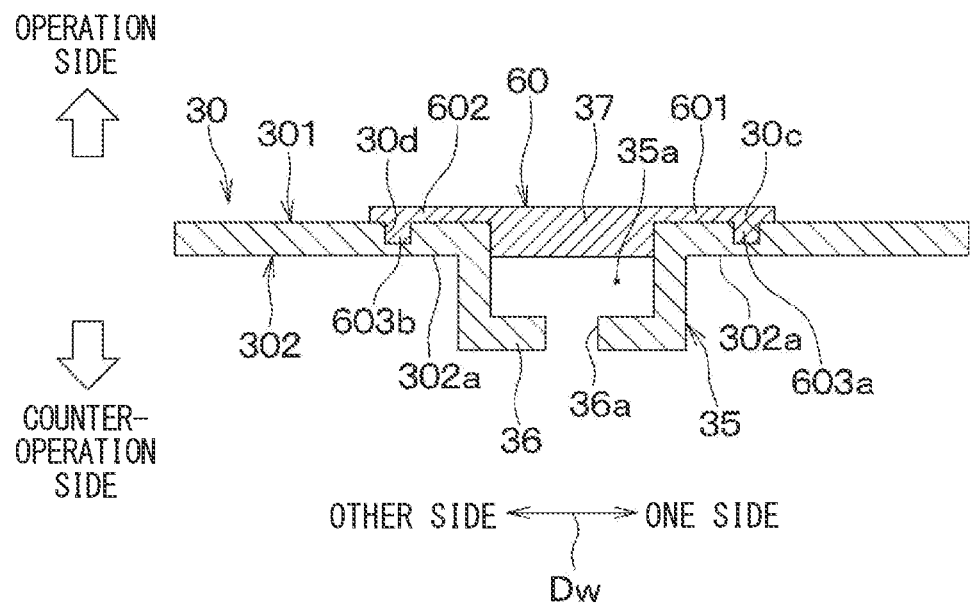
FIG. 21 is a drawing selectively showing a stopper part and a pedal pad and schematically showing the stopper part as is assembled to the pedal pad in a seventh embodiment, equivalent to FIG. 19.

As shown in FIG. 21, each of the one side coupling hole 30c and the other side coupling hole 30d of the pedal pad 30 is not a through hole but is a non-penetrating hole. That is, each of the one side coupling hole 30c and the other side coupling hole 30d is closed on the pedal back side 302.

The present embodiment is identical with the fifth embodiment except the foregoing. In the present embodiment, the effects brought about by configuration elements common to those in the fifth embodiment can be obtained as in the fifth embodiment.

Eighth Embodiment

A description will be given to an eighth embodiment. With respect to the present embodiment, a description will be given mainly to a difference from the fourth embodiment.

Figure 22:
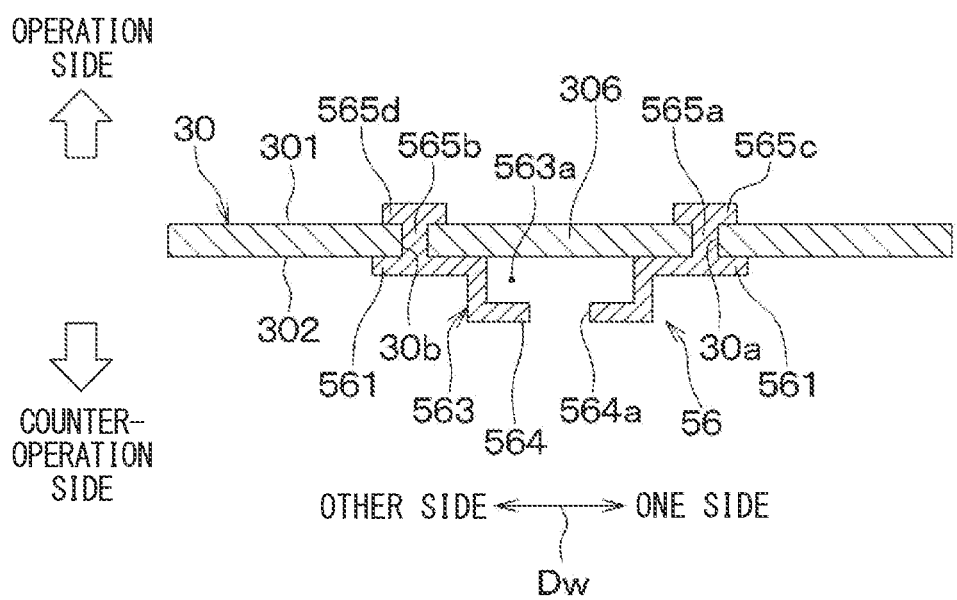
FIG. 22 is a drawing selectively showing a stopper part and a pedal pad and schematically showing the stopper part as is assembled to the pedal pad in an eighth embodiment, equivalent to FIG. 18.

As shown in FIG. 22, the present embodiment adopts caulking of the bosses 565a, 565b instead of press fitting of the bosses 565a, 565b to join the pedal pad 30 and the stopper part 56 to each other.

Specifically, since the stopper part 56 is formed of metal, the one side boss 565a and the other side boss 565b are also formed of metal. The one side boss 565a is inserted into the one side coupling hole 30a as a through hole from the pedal back side 302 to the pedal front side 301 and then the pedal front side 301 side of the one side boss 565a is caulked. That is, one side caulking portion 565c wider in diameter than the one side coupling hole 30a is formed on the pedal front side 301 side of the one side boss 565a.

This is also the case with the other side boss 565b. That is, the other side boss 565b is inserted into the other side coupling hole 30b as a through hole from the pedal back side 302 to the pedal front side 301 and then the pedal front side 301 side of the other side boss 565b is caulked. That is, other side caulking portion 365d wider in diameter than the other side coupling hole 30b is formed on the pedal front side 301 side of the other side boss 565b.

As mentioned above, the stopper part 56 and the pedal pad 30 are joined to each other by caulking of the bosses 565a, 565b.

(1) As mentioned above, according to the present embodiment, the stopper part 56 and the pedal pad 30 are joined to each other by caulking of the bosses 565a, 565b; therefore, the arm 40 and the stopper part 56 can be easily assembled to the pedal pad 30.

The present embodiment is identical with the fourth embodiment except the foregoing. In the present embodiment, the effects brought about by configuration elements common to those in the fourth embodiment can be obtained as in the fourth embodiment.

Ninth Embodiment

A description will be given to a ninth embodiment. With respect to the present embodiment, a description will be given mainly to a difference from the fifth embodiment.

Figure 23:
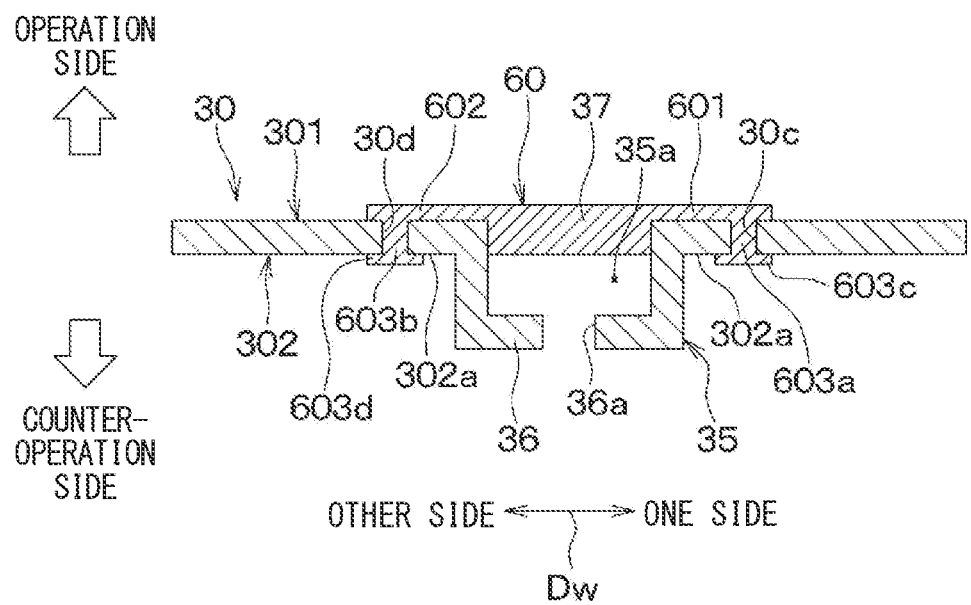
FIG. 23 is a drawing selectively showing a stopper part and a pedal pad and schematically showing the stopper part as is assembled to the pedal pad in a ninth embodiment, equivalent to FIG. 19.

As shown in FIG. 23, the present embodiment adopts the same caulking as the eighth embodiment does instead of press fitting of the bosses 603a, 603b to join the pedal pad 30 and the stopper part 60 to each other.

Specifically, since the stopper part 60 is formed of metal, the one side boss 603a and the other side boss 603b are also formed of metal. The one side boss 603a is inserted into the one side coupling hole 30c as a through hole from the pedal front side 301 to the pedal back side 302 and then the pedal back side 302 side of the one side boss 603a is caulked. That is, one side caulking portion 603c winder in diameter than the one side coupling hole 30c is formed on the pedal back side 302 side of the one side boss 603a.

The is also the case with the other side boss 603b. That is, the other side boss 603b is inserted into the other side coupling hole 30d as a through hole from the pedal front side 301 to the pedal back side 302 and then the pedal back side 302 side of the other side boss 603b is caulked. That is, other side caulking portion 603d winder in diameter than the other side coupling hole 30d is formed on the pedal back side 302 side of the other side boss 603b.

As mentioned above, the stopper part 56 and the pedal pad 30 are joined to each other by caulking of the bosses 603a, 603b.

(1) As mentioned above, according to the present embodiment, the stopper part 60 and the pedal pad 30 are joined to each other by the same caulking as in the eighth embodiment. Therefore, the working-effects by the caulking can be obtained as in the eighth embodiment.

The present embodiment is identical with the fifth embodiment except the foregoing. In the present embodiment, the effects brought about by configuration elements common to those in the fifth embodiment can be obtained as in the fifth embodiment.

Tenth Embodiment

A description will be given to a tenth embodiment. With respect to the present embodiment, a description will be given mainly to a difference from the fourth embodiment.

Figure 24:
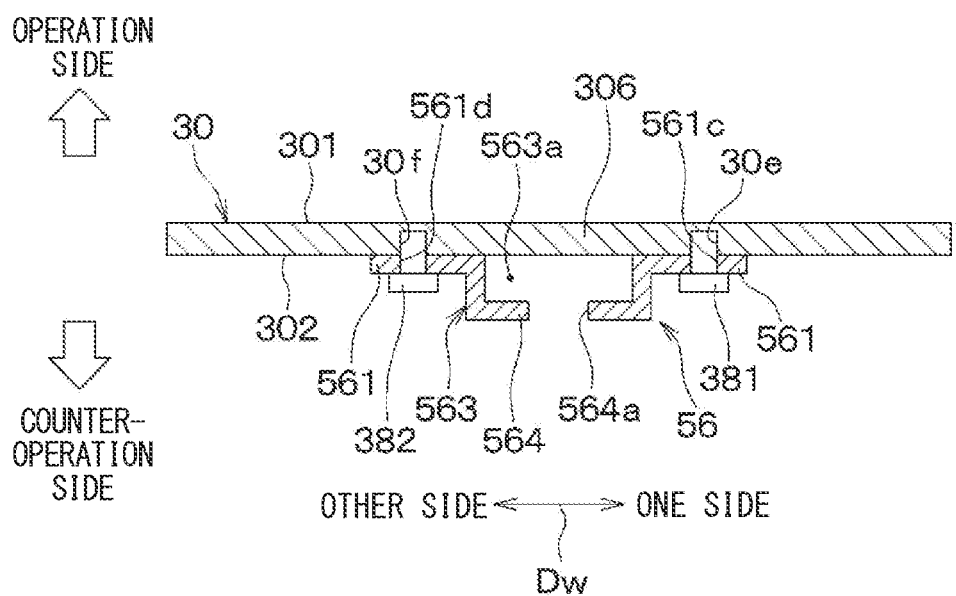
FIG. 24 is a drawing selectively showing a stopper part and a pedal pad and schematically showing the stopper part as is assembled to the pedal pad in a tenth embodiment, equivalent to FIG. 18.

As shown in FIG. 24, the present embodiment adopts screw fixing instead of press fitting of the bosses 565a, 565b to join the pedal pad 30 and the stopper part 56 to each other.

Specifically, the base portion 561 of the stopper part 56 is screw fixed to the pedal pad 30 with one side screw 381 on one side of the protruded portion 563 of the stopper part 56 in the arm end widening direction Dw. In detail, the one side screw 381 is inserted into one side screw insertion hole 561c that is a through hole formed in the base portion 561 and then screwed into one side screw hole 30e with a female screw formed therein provided in the pedal pad 30.

This is also the case with the other side of the protruded portion 563 of the stopper part 56 in the arm end widening direction Dw. That is, the base portion 561 of the stopper part 56 is screw fixed to the pedal pad 30 with other side screw 382 on the other side of the protruded portion 563 in the arm end widening direction Dw. In detail, the other side screw 382 is inserted into other side screw insertion hole 561d that is a through hole formed in the base portion 561 and then screwed into other side screw hole 30f with a female screw formed therein provided in the pedal pad 30.

(1) As mentioned above, according to the present embodiment, the pedal pad 30 and the stopper part 56 are joined to each other by screw fixing; therefore, the arm 40 and the stopper part 56 can be easily assembled to the pedal pad 30.

The present embodiment is identical with the fourth embodiment except the foregoing. In the present embodiment, the effects brought about by configuration elements common to those in the fourth embodiment can be obtained as in the fourth embodiment.

Eleventh Embodiment

A description will be given to an eleventh embodiment. With respect to the present embodiment, a description will be given mainly to a difference from the fifth embodiment.

Figure 25:
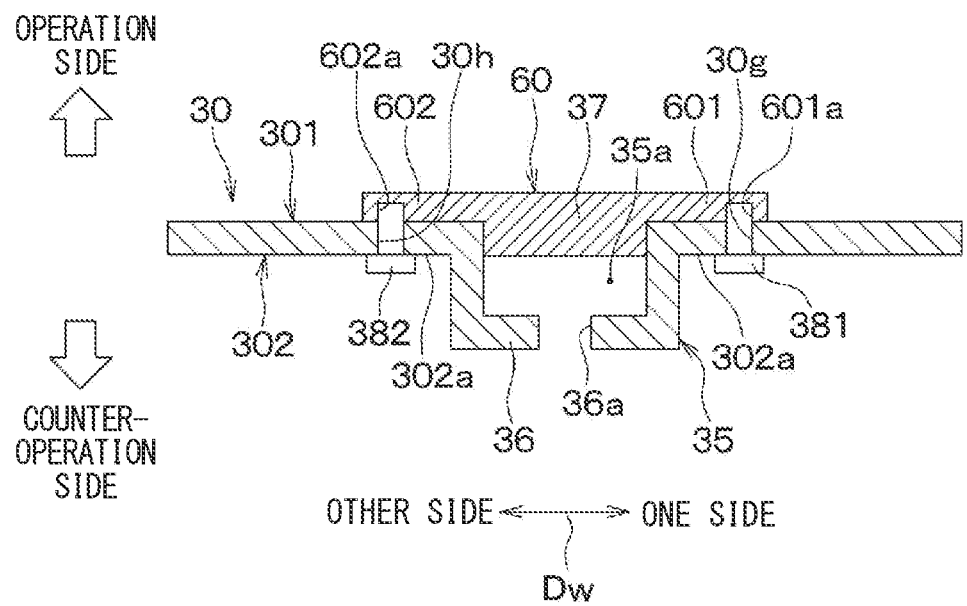
FIG. 25 is a drawing selectively showing a stopper part and a pedal pad and schematically showing the stopper part as is assembled to the pedal pad in an eleventh embodiment, equivalent to FIG. 19.

As shown in FIG. 25, the present embodiment adopts the same screw fixing as the tenth embodiment does instead of press fitting of the bosses 603a, 603b to join the pedal pad 30 and the stopper part 60 to each other.

Specifically, the one side joining portion 601 of the stopper part 60 is screw fixed to the pedal pad 30 with one side screw 381 on one side of the protruded portion 35 of the pedal pad 30 in the arm end widening direction Dw. In detail, the one side screw 381 is inserted into one side screw insertion hole 30g that is a through hole formed in the pedal pad 30 and then screwed into one side screw hole 601a with a female screw formed therein provided in the one side joining portion 601.

This is also the case with the other side of the protruded portion 35 in the arm end widening direction Dw. That is, the other side joining portion 602 of the stopper part 60 is screw fixed to the pedal pad 30 with other side screw 382 on the other side of the protruded portion 35 in the arm end widening direction Dw. In detail, the other side screw 382 is inserted into other side screw insertion hole 30h that is a through hole formed in the pedal pad 30 and then screwed into other side screw hole 602a with a female screw formed therein provided in the other side joining portion 602.

(1) As mentioned above, according to the present embodiment, the stopper part 60 and the pedal pad 30 are joined to each other by the same screw fixing as in the 1 tenth embodiment. Therefore, the working-effects by the screw fixing can be obtained as in the tenth embodiment.

The present embodiment is identical with the fifth embodiment except the foregoing. In the present embodiment, the effects brought about by configuration elements common to those in the fifth embodiment can be obtained as in the fifth embodiment.

Twelfth Embodiment

A description will be given to a twelfth embodiment. With respect to the present embodiment, a description will be given mainly to a difference from the fourth embodiment.

Figure 26:
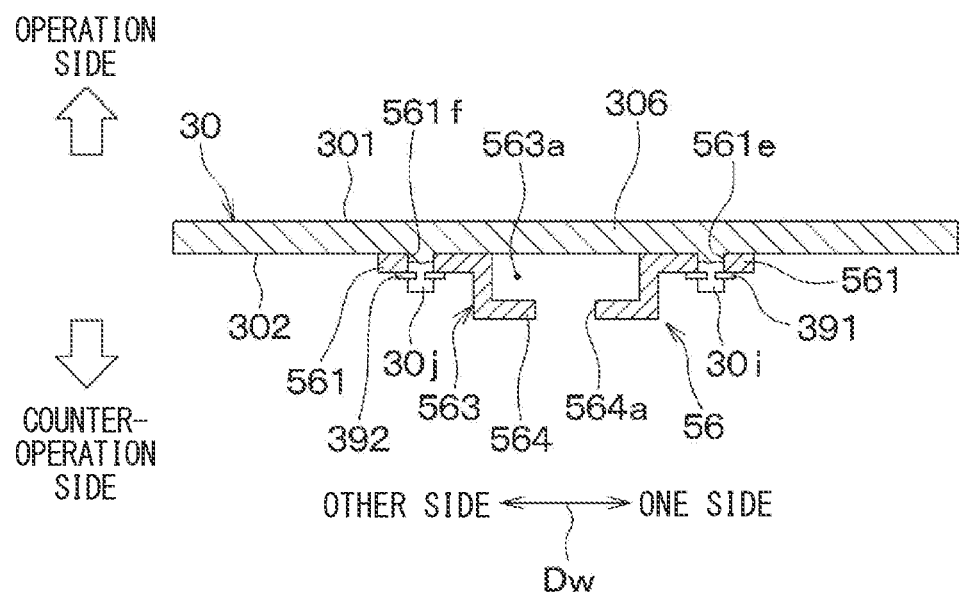
FIG. 26 is a drawing selectively showing a stopper part and a pedal pad and schematically showing the stopper part as is assembled to the pedal pad in a twelfth embodiment, equivalent to FIG. 18.

As shown in FIG. 26, the present embodiment adopts joining by retaining rings 391, 392 instead of press fitting of the bosses 565a, 565b to join the pedal pad 30 and the stopper part 56 to each other.

Specifically, the pedal pad 30 includes one side boss 30i and other side boss 30j protruded from the pedal back side 302. The one side boss 30i is located on one side of the protruded portion 563 in the arm end widening direction Dw and the other side boss 30j is located on the other side of the protruded portion 563 in the arm end widening direction Dw. Since the pedal pad 30 is formed of metal, these bosses 30i, 30j are also formed of metal.

One side through hole 561e with the one side boss 30i inserted thereinto and other side through hole 561f with the other side boss 30j inserted thereinto are formed in the base portion 561 of the stopper part 56.

The one side retaining ring 391 is fit into an annular groove provided in the periphery of the one side boss 30i and the other side retaining ring 392 is fit into an annular groove provided in the periphery of the other side boss 30j. In short, the one side retaining ring 391 is locked to the one side boss 30i between the base portion 561 of the stopper part 56 and the tip side of the one side boss 30i and the other side retaining ring 392 is locked to the other side boss 30j between the base portion 561 and the tip side of the other side boss 30j.

As mentioned above, the stopper part 56 and the pedal pad 30 are joined to each other by the retaining rings 391, 392 locked to the bosses 30i, 30j.

(1) As mentioned above, according to the present embodiment, the stopper part 56 and the pedal pad 30 are joined to each other by the retaining rings 391, 392 locked to the bosses 30i, 30j. Therefore, the arm 40 and the stopper part 56 can be easily assembled to the pedal pad 30.

The present embodiment is identical with the fourth embodiment except the foregoing. In the present embodiment, the effects brought about by configuration elements common to those in the fourth embodiment can be obtained as in the fourth embodiment.

Thirteenth Embodiment

A description will be given to a thirteenth embodiment. With respect to the present embodiment, a description will be given mainly to a difference from the fifth embodiment.

Figure 27:
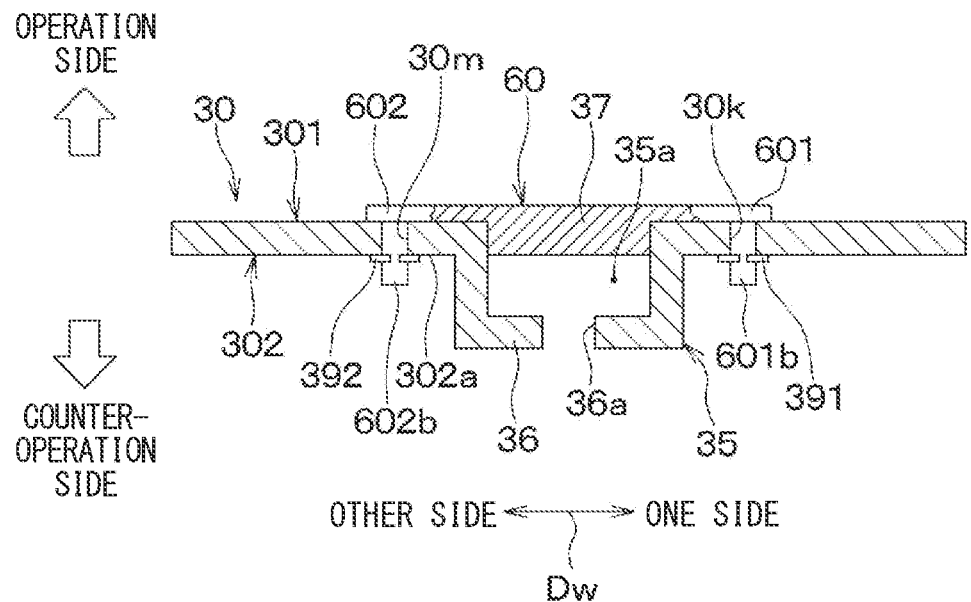
FIG. 27 is a drawing selectively showing a stopper part and a pedal pad and schematically showing the stopper part as is assembled to the pedal pad in a thirteenth embodiment, equivalent to FIG. 19.

As shown in FIG. 27, the present embodiment adopts joining by the same retaining rings 391, 392 as in the 12$^{th}$ embodiment instead of press fitting of the bosses 603a, 603b to join the pedal pad 30 and the stopper part 60 to each other.

Specifically, the one side joining portion 601 of the stopper part 60 includes one side boss 601b protruded to the pedal pad 30 side and the other side joining portion 602 includes other side boss 602b protruded to the pedal pad 30 side. The one side boss 601b is located on one side of the protruded portion 35 of the pedal pad 30 in the arm end widening direction Dw and the other side boss 602b is located on the other side of the protruded portion 35 in the arm end widening direction Dw. Since the stopper part 60 is formed of metal, these bosses 601b, 602b are also formed of metal.

One side through hole 30k with the one side boss 601b inserted thereinto and other side through hole 30m with the other side boss 602b inserted thereinto are formed in the pedal pad 30.

The one side retaining ring 391 is locked to the one side boss 601b in the present embodiment corresponding to the one side boss 30i in the 12$^{th}$ embodiment as in the 12$^{th}$ embodiment. The other side retaining ring 392 is locked to the other side boss 602b in the present embodiment corresponding to the other side boss 30j in the 12$^{th}$ embodiment as in the 12$^{th}$ embodiment.

As mentioned above, the stopper part 60 and the pedal pad 30 are joined to each other by the retaining rings 391, 392 locked to the bosses 601b, 602b.

(1) As mentioned above, according to the present embodiment, the stopper part 60 and the pedal pad 30 are joined to each other by the retaining rings 391, 392 as in the 12$^{th}$ embodiment. Therefore, the working-effects by the retaining rings 391, 392 can be obtained as in the 12$^{th}$ embodiment.

The present embodiment is identical with the fifth embodiment except the foregoing. In the present embodiment, the effects brought about by configuration elements common to those in the fifth embodiment can be obtained as in the fifth embodiment.

Fourteenth Embodiment

A description will be given to a second embodiment. With respect to the present embodiment, a description will be given mainly to a difference from the eighth embodiment.

Figure 28:
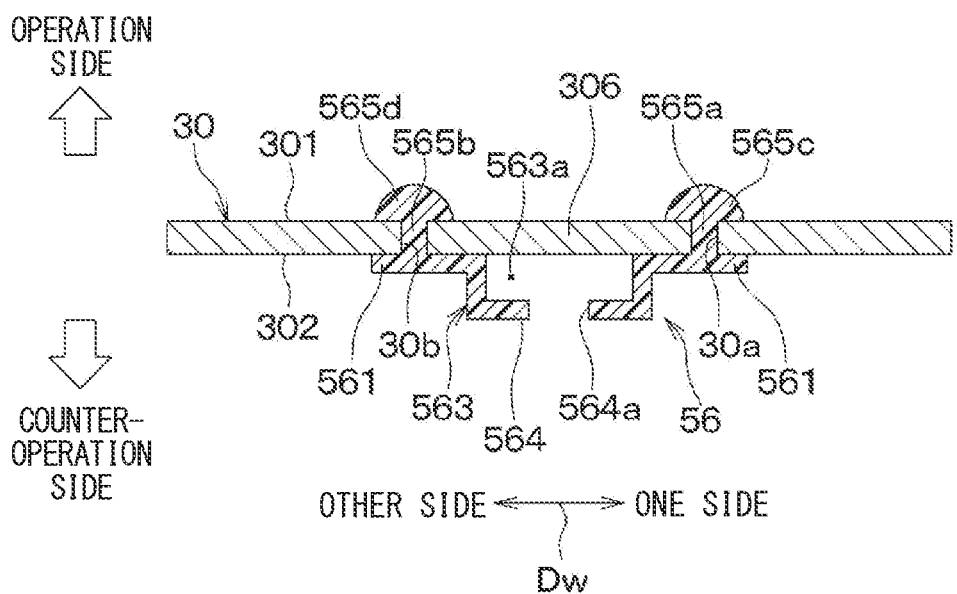
FIG. 28 is a drawing selectively showing a stopper part and a pedal pad and schematically showing the stopper part as is assembled to the pedal pad in a fourteenth embodiment, equivalent to FIG. 18.

As shown in FIG. 28, the stopper part 56 and the pedal pad 30 are joined to each other by thermal caulking of the one side boss 565a and thermal caulking of the other side boss 565b. In the present embodiment, the stopper part 56 is formed of thermoplastic resin instead of metal. For this reason, the one side boss 565a and the other side boss 565b are also formed of thermoplastic resin.

The thermal caulking cited here is not to melt the bosses 565a, 565b of resin but to plastically deform the bosses 565a, 565b by applying heat and pressure to the bosses. Caulking portions 565c, 565d are respectively formed at the tip portions of the bosses 565a, 565b by this thermal caulking.

(1) As mentioned above, according to the present embodiment, the stopper part 56 is formed of resin and thus, the first arrangement section 564 is also formed of resin. Therefore, wear due to sliding of the first arrangement section 564 and the arm one end 401 can be reduced.

(2) According to the present invention, the stopper part 56 and the pedal pad 30 are joined to each other by thermal caulking of the bosses 565a, 565b; therefore, the arm 40 and the stopper part 56 can be easily assembled to the pedal pad 30.

The present embodiment is identical with the eighth embodiment except the foregoing. In the present embodiment, the effects brought about by configuration elements common to those in the eighth embodiment can be obtained as in the eighth embodiment.

Fifteenth Embodiment

A description will be given to a second embodiment. With respect to the present embodiment, a description will be given mainly to a difference from the ninth embodiment.

Figure 29:
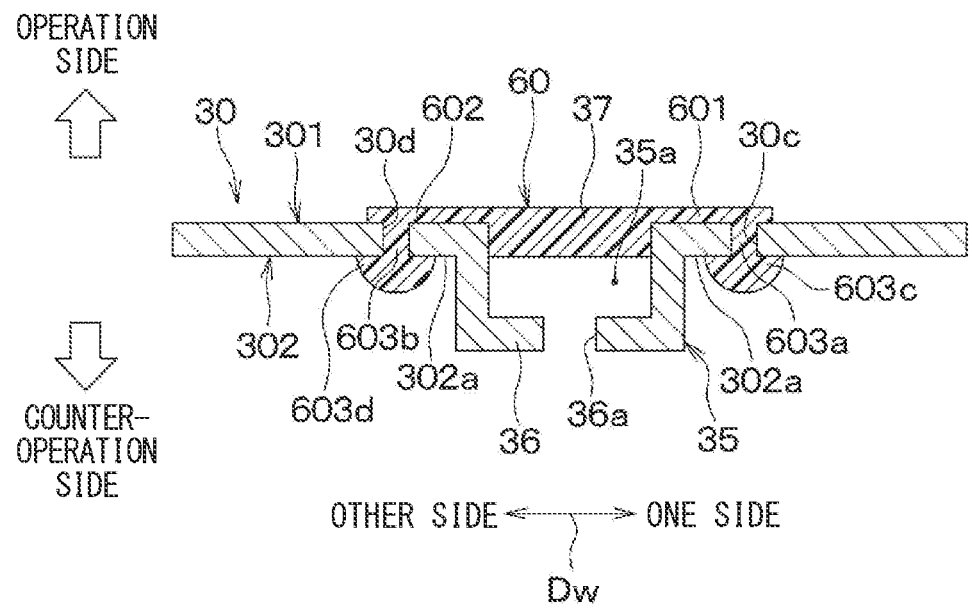
FIG. 29 is a drawing selectively showing a stopper part and a pedal pad and schematically showing the stopper part as is assembled to the pedal pad in a fifteenth embodiment, equivalent to FIG. 19.

As shown in FIG. 29, the stopper part 60 and the pedal pad 30 are joined to each other by thermal caulking of the one side boss 603a and thermal caulking of the other side boss 603b. In the present embodiment, the stopper part 60 is formed of thermoplastic resin instead of metal. For this reason, the one side boss 603a and the other side boss 603b are also formed of resin.

Caulking portions 603c, 603d are respectively formed at the tip portions of the bosses 603a, 603b by thermal caulking of the bosses 603a, 603b.

(1) As mentioned above, according to the present embodiment, the stopper part 60 and the pedal pad 30 are joined to each other by the same thermal caulking as in the fourteenth embodiment. Therefore, the working-effects by the thermal caulking can be obtained as in the fourteenth embodiment.

The present embodiment is identical with the ninth embodiment except the foregoing.

Sixteenth Embodiment

A description will be given to a second embodiment. With respect to the present embodiment, a description will be given mainly to a difference from the tenth embodiment.

Figure 30:
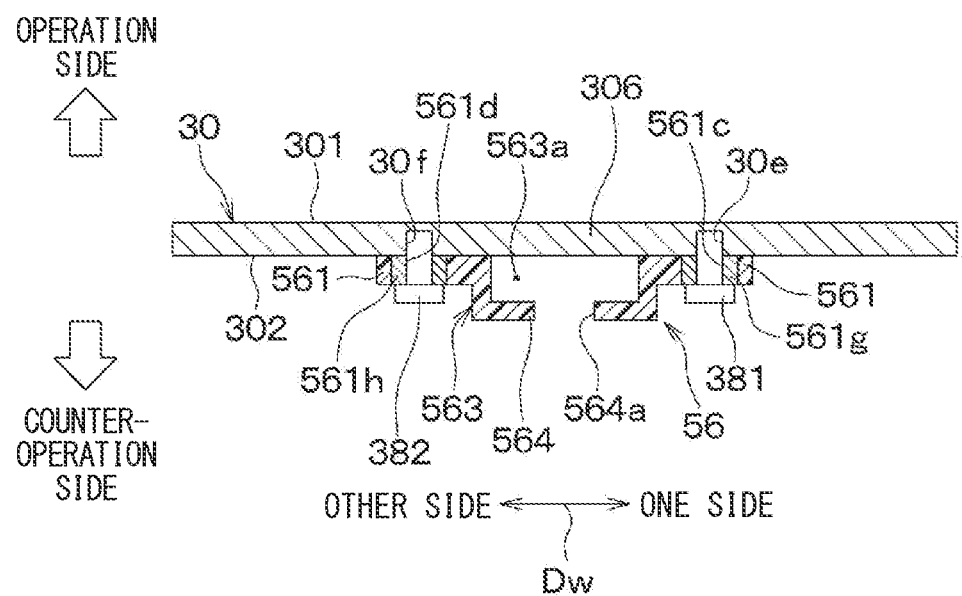
FIG. 30 is a drawing selectively showing a stopper part and a pedal pad and schematically showing the stopper part as is assembled to the pedal pad in a sixteenth embodiment, equivalent to FIG. 18.

As shown in FIG. 30, in the present embodiment, the stopper part 56 is formed of resin instead of metal. For this reason, the base portion 561 is also formed of resin. The stopper part 56 includes one side insert 561g and other side insert 561h made of metal integrally fixed to the base portion 561 as a resin part by insert molding of the stopper part 56. To confirmatively describe, the pedal pad 30 in the present embodiment is formed of metal as in the tenth embodiment.

The one side insert 561g is located on one side of the protruded portion 563 of the stopper part 56 in the arm end widening direction Dw and the other side insert 561h is located on the other side of the protruded portion 563 in the arm end widening direction Dw.

One side screw insertion hole 561c into which one side screw 381 is to be inserted is not formed directly in the base portion 561 but is formed in the one side insert 561g. Similarly, other side screw insertion hole 561d into which other side screw 382 is to be inserted is not formed directly in the base portion 561 but is formed in the other side insert 561h.

(1) As mentioned above, the stopper part 56 and the pedal pad 30 are joined to each other by screw fastening the pedal pad 30 to the one side and other side inserts 561g, 561h of the stopper part 56. Therefore, the arm 40 and the stopper part 56 can be easily assembled to the pedal pad 30.

According to the present embodiment, the seat portions of the stopper part 56 pressed against by the heads of the screws 381, 382 are the inserts 561g, 561h made of metal;

therefore, the durability of the stopper part 56 can be more enhanced as compared with cases where the seat portions are made of resin.

The present embodiment is identical with the tenth embodiment except the foregoing. In the present embodiment, the effects brought about by configuration elements common to those in the tenth embodiment can be obtained as in the tenth embodiment.

Seventeenth Embodiment

A description will be given to a second embodiment. With respect to the present embodiment, a description will be given mainly to a difference from the eleventh embodiment.

Figure 31:
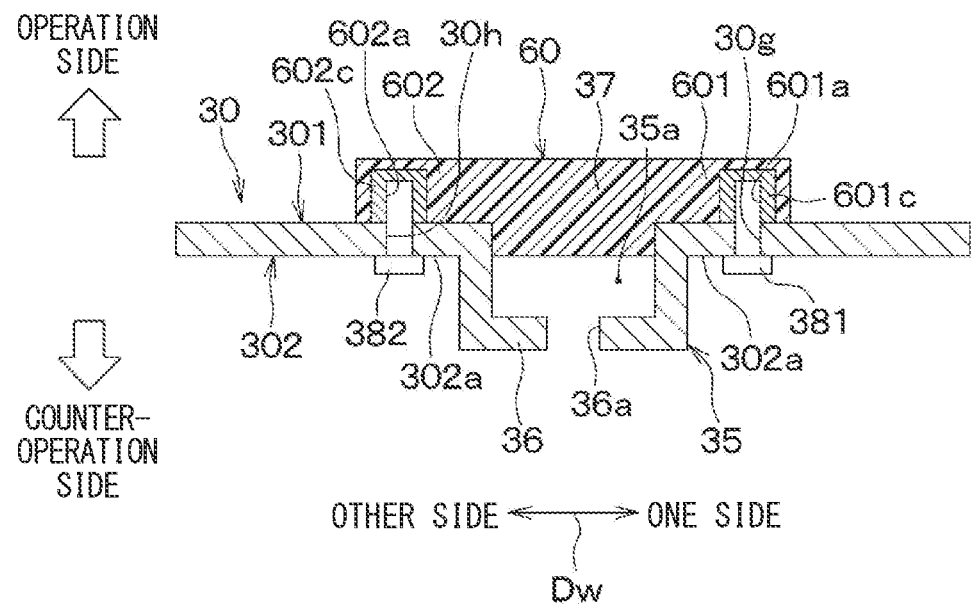
FIG. 31 is a drawing selectively showing a stopper part and a pedal pad and schematically showing the stopper part as is assembled to the pedal pad in a seventeenth embodiment, equivalent to FIG. 19.

As shown in FIG. 31, in the present embodiment, the stopper part 60 is formed of resin instead of meal. For this reason, the one side joining portion 601 and the other side joining portion 602 are also formed of resin. The stopper part 60 includes one side insert 601c made of metal and other side inset 602c made of metal.

The one side insert 601c is integrally fixed to the one side joining portion 601 as a resin part by insert molding of the stopper part 60. The other side insert 602c is integrally fixed to the other side joining portion 602 as a resin part by insert molding of the stopper part 60. To confirmatively describe, the pedal pad 30 in the present embodiment is formed of metal as in the eleventh embodiment.

The one side insert 601c is located on one side of the protruded portion 35 of the pedal pad 30 in the arm end widening direction Dw and the other side insert 602c is located on the other side of the protruded portion 35 in the arm end widening direction Dw.

The one side screw hole 601a into which the one side screw 381 is screwed is not formed directly in the one side joining portion 601 but is formed in the one side insert 601c. Similarly, the other side screw hole 602a into which the other side screw 382 is screwed is not formed directly in the other side joining portion 602 but is formed in the other side insert 602c.

(1) As mentioned above, the stopper part 60 and the pedal pad 30 are joined to each other by screw fastening the pedal pad 30 respectively to the one side and other side inserts 601c, 602c of the stopper part 60. Therefore, the arm 40 and the stopper part 60 can be easily assembled to the pedal pad 30.

According to the present embodiment, the screw holes 601a, 602a are formed respectively in the inserts 601c, 602c made of metal; therefore, the durability of the stopper part 60 can be more enhanced as compared with casers where the screw holes 601a, 602a are formed in a resin part.

The present embodiment is identical with the eleventh embodiment except the foregoing. In the present embodiment, the effects brought about by configuration elements common to those in the eleventh embodiment can be obtained as in the eleventh embodiment.

Eighteenth Embodiment

A description will be given to a second embodiment. With respect to the present embodiment, a description will be given mainly to a difference from the fourth embodiment.

Figure 32:
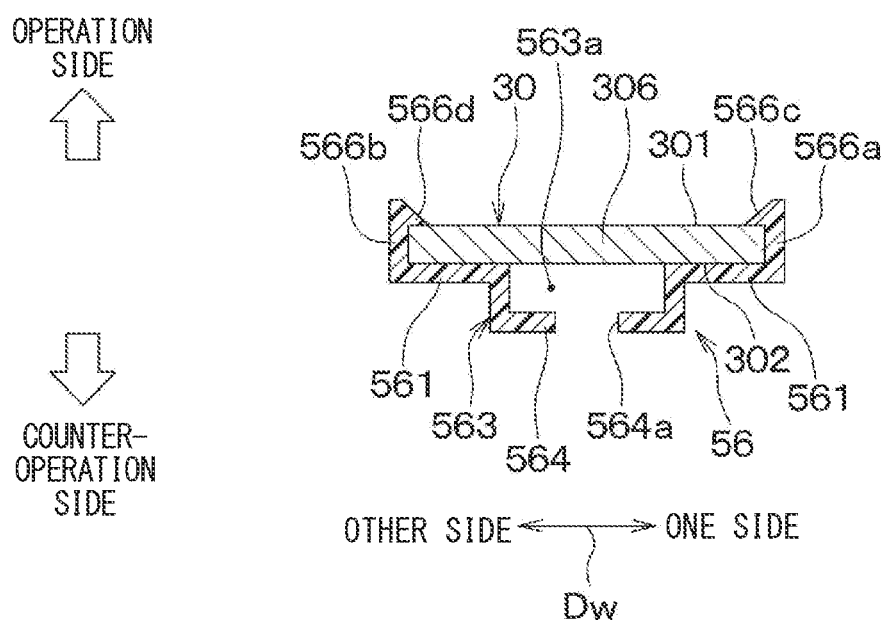
FIG. 32 is a drawing selectively showing a stopper part and a pedal pad and schematically showing the stopper part as is assembled to the pedal pad in an eighteenth embodiment, equivalent to FIG. 18.

As shown in FIG. 32, the present embodiment adopts a snap-fit structure instead of press fitting of the bosses 565a, 565b to join the pedal pad 30 and the stopper part 56 to each other. That is, the pedal pad 30 and the stopper part 56 are joined to each other by a snap-fit structure.

Specifically, in the present embodiment, the stopper part 56 includes one side holding portion 566a and other side holding portion 566b protruded from the base portion 561 to the pedal pad 30 side.

For example, the stopper part 56 may be formed of either of metal and resin as long as the material has elasticity materializing a snap-fit structure but in the present embodiment, the stopper part is formed of resin having elasticity. Therefore, the one side holding portion 566a and the other side holding portion 566b are also formed of resin.

The one side holding portion 566a is located on one side of the protruded portion 563 in the arm end widening direction Dw and passes through one side of the pedal pad 30 in the arm end widening direction Dw and is extended from the base portion 561 to the opposite side with the pedal pad 30 in between. The one side holding portion 566a has at the tip portion of the one side holding portion 566a a claw portion 566c protruded to the other side in the arm end widening direction Dw.

The other side holding portion 566b is located on the other side of the protruded portion 563 in the arm end widening direction Dw and passes through the other side of the pedal pad 30 in the arm end widening direction Dw and is extended from the base portion 561 to the opposite side with the pedal pad 30 in between. The other side holding portion 566b has at the tip portion of the other side holding portion 566b a claw portion 566d protruded to one side in the arm end widening direction Dw.

The claw portion 566c of the one side holding portion 566a and the claw portion 566d of the other side holding portion 566b are respectively engaged with the pedal pad 30 at the pedal front side 301.

(1) As mentioned above, according to the present embodiment, the pedal pad 30 and the stopper part 56 are joined to each other by a snap-fit structure; therefore, the arm 40 and the stopper part 56 can be easily assembled to the pedal pad 30.

The present embodiment is identical with the fourth embodiment except the foregoing. In the present embodiment, the effects brought about by configuration elements common to those in the fourth embodiment can be obtained as in the fourth embodiment.

Nineteenth Embodiment

A description will be given to a second embodiment. With respect to the present embodiment, a description will be given mainly to a difference from the fifth embodiment.

Figure 33:
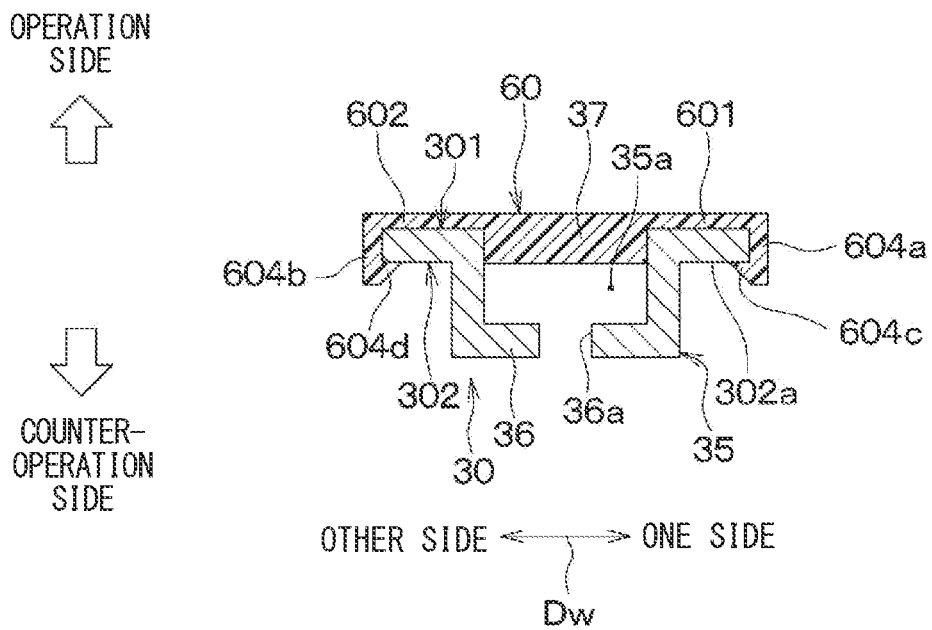
FIG. 33 is a drawing selectively showing a stopper part and a pedal pad and schematically showing the stopper part as is assembled to the pedal pad in a nineteenth embodiment, equivalent to FIG. 19.

As shown in FIG. 33, the present embodiment adopts the same snap-fit structure as in the eighteenth embodiment instead of press fitting of bosses 603a, 603b to join the pedal pad 30 and the stopper part 60 to each other. That is, the pedal pad 30 and the stopper part 60 are joined to each other by a snap-fit structure.

Specifically, in the present embodiment, the stopper part 60 includes one side holding portion 604a protruded from the one side joining portion 601 to the pedal pad 30 side and other side holding portion 604b protruded from the other side joining portion 602 to the pedal pad 30 side. The one side holding portion 604a and the other side holding portion 604b constitute the same snap-fit structure as in the eighteenth embodiment.

For example, the stopper part 60 in the present embodiment may be formed of either of metal and resin as the stopper part 56 in the eighteenth embodiment is but in the present embodiment, the stopper part is formed of resin having elasticity. Therefore, the one side holding portion 604a and the other side holding portion 604b are also formed of resin.

The one side holding portion 604a is located on one side of the protruded portion 35 in the arm end widening direction Dw and passes through one side of the pedal pad 30 in the arm end widening direction Dw and is extended from the one side joining portion 601 to the opposite side with the pedal pad 30 in between. The one side holding portion 604a has at the tip portion of the one side holding portion 604a a claw portion 604c protruded to the other side in the arm end widening direction Dw.

The other side holding portion 604b is located on the other side of the protruded portion 35 in the arm end widening direction Dw and passes through the other side of the pedal pad 30 in the arm end widening direction Dw and is extended from the other side joining portion 602 to the opposite side with the pedal pad 30 in between. The other side holding portion 604b has at the tip portion of the other side holding portion 604b a claw portion 604d protruded to one side in the arm end widening direction Dw.

The claw portion 604c of the one side holding portion 604a and the claw portion 604d of the other side holding portion 604b are respectively engaged with the pedal pad 30 at the pedal back side 302.

(1) As mentioned above, according to the present embodiment, the stopper part 60 and the pedal pad 30 are joined to each other by the same snap-fit structure as in the eighteenth embodiment. Therefore, the working-effects by the snap-fit structure can be obtained as in the eighteenth embodiment.

The present embodiment is identical with the fifth embodiment except the foregoing. In the present embodiment, the effects brought about by configuration elements common to those in the fifth embodiment can be obtained as in the fifth embodiment.

Twentieth Embodiment

A description will be given to a second embodiment. With respect to the present embodiment, a description will be given mainly to a difference from the eighteenth embodiment.

Figure 34:
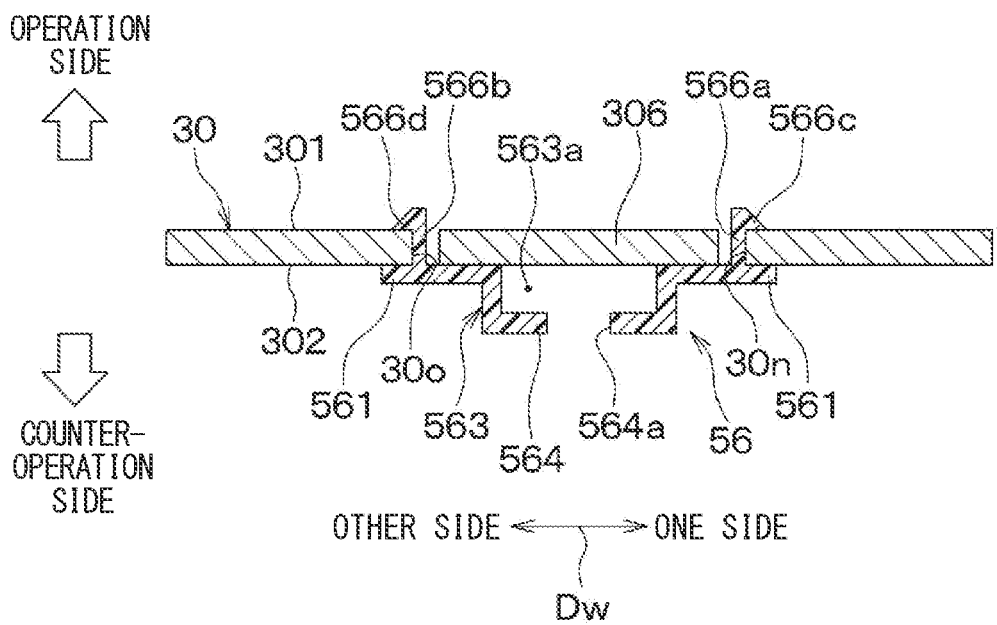
FIG. 34 is a drawing selectively showing a stopper part and a pedal pad and schematically showing the stopper part as is assembled to the pedal pad in a twentieth embodiment, equivalent to FIG. 18.

As shown in FIG. 34, also in the present embodiment, the pedal pad 30 and the stopper part 56 are joined to each other by a snap-fit structure as in the eighteenth embodiment.

In the present embodiment, however, the one side holding portion 566a passes through a through hole 30n provided in the pedal pad 30 instead of passing through one side of the pedal pad 30 in the arm end widening direction Dw and is extended from the base portion 561 to the opposite side with the pedal pad 30 in between. The claw portion 566c provided at the tip portion of the one side holding portion 566a is protruded to one side, not to the other side, in the arm end widening direction Dw.

The is also the case with the other side holding portion 566b. That is, the other side holding portion 566b passes through a through hole 30o provided in the pedal pad 30 instead of passing through the other side of the pedal pad 30 in the arm end widening direction Dw and is extended from the base portion 561 to the opposite side with the pedal pad 30 in between. The claw portion 566d provided at the tip portion of the other side holding portion 566b is protruded to the other side, not to one side, in the arm end widening direction Dw.

The present embodiment is identical with the eighteenth embodiment except the foregoing. In the present embodiment, the effects brought about by configuration elements common to those in the eighteenth embodiment can be obtained as in the eighteenth embodiment.

Twenty-First Embodiment

A description will be given to a second embodiment. With respect to the present embodiment, a description will be given mainly to a difference from the nineteenth embodiment.

Figure 35:
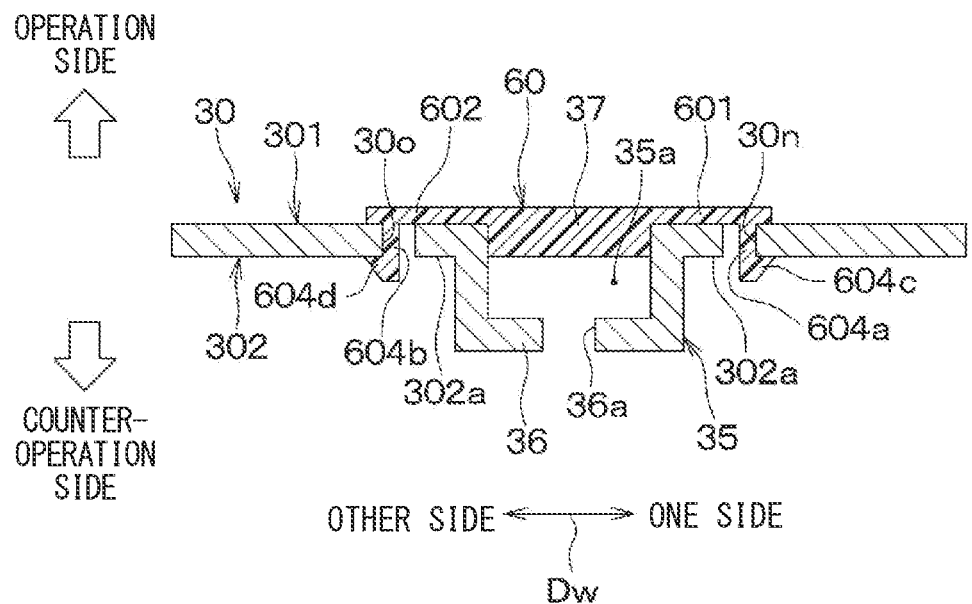
FIG. 35 is a drawing selectively showing a stopper part and a pedal pad and schematically showing the stopper part as is assembled to the pedal pad in a twenty-first embodiment, equivalent to FIG. 19.

As shown in FIG. 35, also in the present embodiment, the pedal pad 30 and the stopper part 60 are joined to each other by a snap-fit structure as in the nineteenth embodiment.

In the present embodiment, however, the one side holding portion 604a passes through a through hole 30n provided in the pedal pad 30 instead of passing through one side of the pedal pad 30 in the arm end widening direction Dw and is extended from the one side joining portion 601 to the opposite side with the pedal pad 30 in between. The claw portion 604c provided at the tip portion of the one side holding portion 604a is protruded to one side, not to the other side, in the arm end widening direction Dw.

This is also the case with the other side holding portion 604b. That is, the other side holding portion 604b passes through a through hole 30o provided in the pedal pad 30 instead of passing through the other side of the pedal pad 30 in the arm end widening direction Dw and is extended from the other side joining portion 602 to the opposite side with the pedal pad 30 in between. The claw portion 604d provided at the tip portion of the other side holding portion 604b is protruded to the other side, not to one side, in the arm end widening direction Dw.

The present embodiment is identical with the nineteenth embodiment except the foregoing. In the present embodiment, the effects brought about by configuration elements common to those in the nineteenth embodiment can be obtained as in the nineteenth embodiment.

Twenty-Second Embodiment

A description will be given to a second embodiment. With respect to the present embodiment, a description will be given mainly to a difference from the first embodiment.

Figure 36:
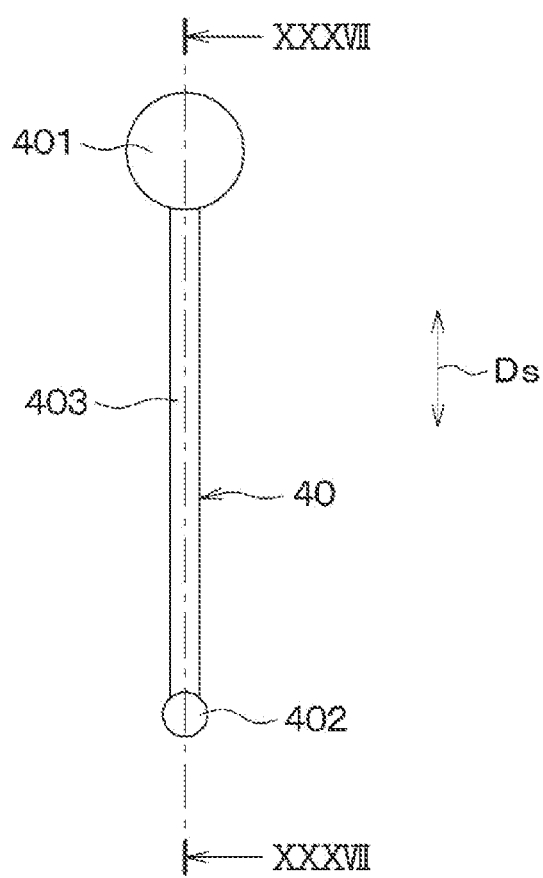
FIG. 36 is a drawing showing an arm as a single component as viewed in the same direction as in FIG. 5 in a twenty-second embodiment, equivalent to FIG. 5.
Figure 37:
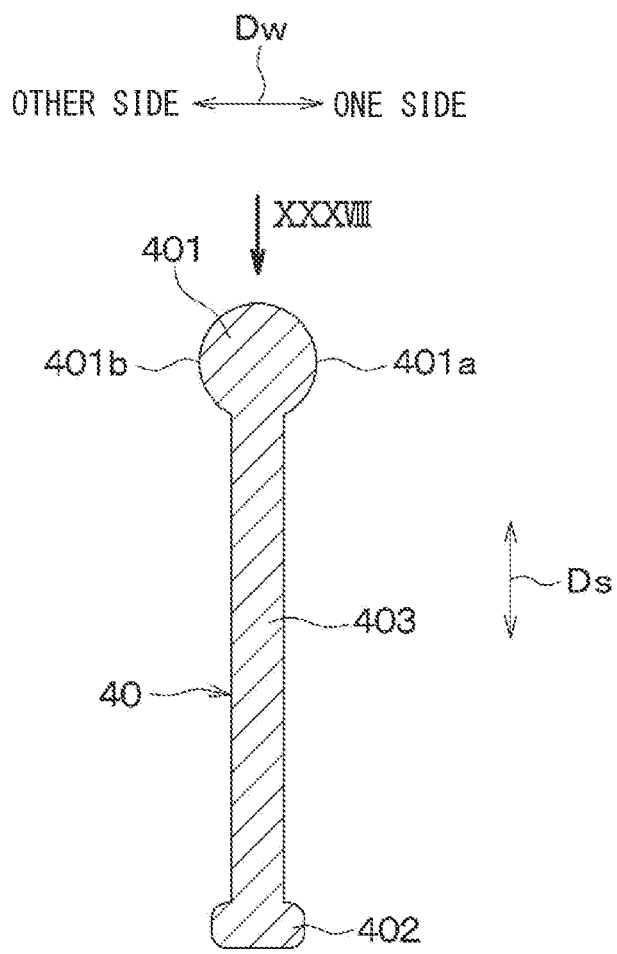
FIG. 37 is a sectional view showing a section taken along line XXXVII-XXXVII of FIG. 36 in the twenty-second embodiment, equivalent to FIG. 6.
Figure 38:
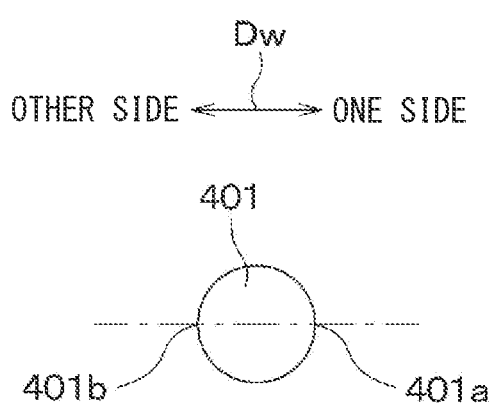
FIG. 38 is an arrow view as viewed in a direction of XXXVIII of FIG. 37 in the twenty-second embodiment, equivalent to FIG. 7.

As shown in FIG. 36 to FIG. 38, in the present embodiment, the arm one end 401 is in such a shape that the arm one end is widened from the arm body 403 to both sides in the arm end widening direction Dw as in the first embodiment.

However, unlike the first embodiment, the arm one end 401 in the present embodiment forms a spherical shape. Therefore, also in the present embodiment, as shown in FIG. 36, the arm one end 401 forms a circular shape as viewed in a direction along the arm end widening direction Dw (for example, as viewed in a direction along arrow V of FIG. 4).

The present embodiment is identical with the first embodiment except the foregoing. In the present embodiment, the effects brought about by configuration elements common to those in the first embodiment can be obtained as in the first embodiment.

The present embodiment is a modification to the first embodiment but the present embodiment can also be combined with any of the second to twenty-first embodiments.

Twenty-Third Embodiment

A description will be given to a second embodiment. With respect to the present embodiment, a description will be given mainly to a difference from the first embodiment.

Figure 39:
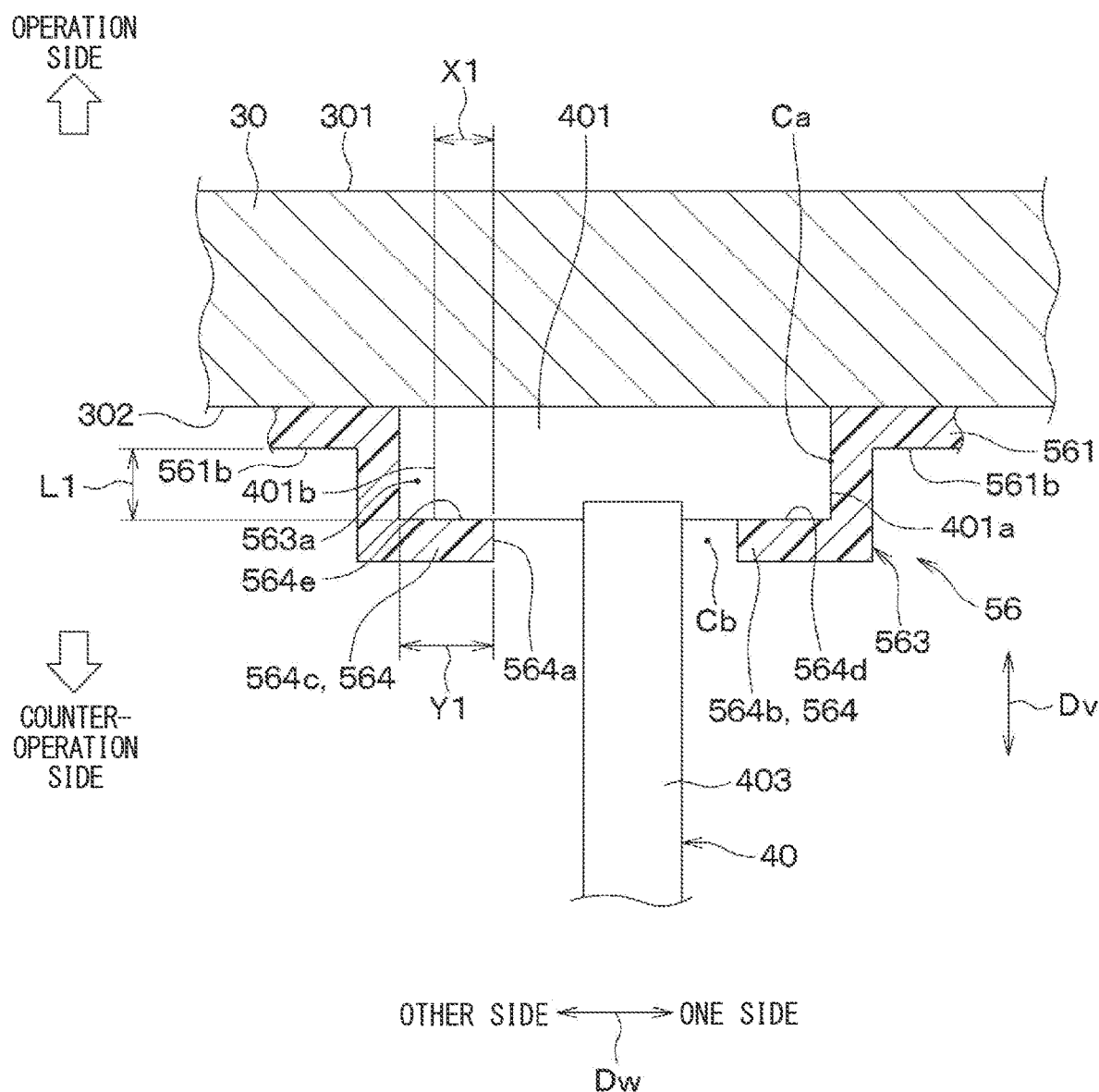
FIG. 39 is a sectional view showing one side eccentricity state in which an arm is biased to one side in an arm end widening direction and is abutted against a stopper part in the arm end widening direction in a twenty-third direction, showing a section in the same orientation as in FIG. 4.

The stopper part 56 in the present embodiment is formed of resin. The dimensional relation between the arm 40 and the stopper part 56 is as described below:

In one side biased state, which is a state shown in FIG. 39, the widening-direction other end 401*b* of the arm one end 401 is located between the insertion hole 564*a* and the other side in the arm end widening direction Dw and at the same time, the following Formula F1 and the following formula F2 hold:

$$L1 < 2 \times X1 \quad \text{(Formula F1)}$$

$$L1 < 2 \times Y1 \quad \text{(Formula F2)}$$

The above-mentioned one side biased state in the present embodiment is a state in which the arm 40 is biased to one side in the arm end widening direction Dw and abutted against the stopper part 56 in the arm end widening direction Dw. In other words, the one side biased state is a state in which a clearance Ca between the widening-direction one end 401*a* of the arm one end 401 and an inner wall surface of the protruded portion 563 opposed to the widening-direction one end 401*a* or a clearance Cb between the arm body 403 and the one side receiving portion 564*b* of the first arrangement section 564 is not present. FIG. 39 shows a state in which of the clearances Ca, Cb, the clearance Ca is not present.

In the above-mentioned Formula F1 and Formula F2, L1 denotes a clearance along the normal line direction Dv of the base surface 561*b* or a clearance between a portion of the other-side receiving surface 564*e* of the stopper part 56 located farthest to the counter-operation side in the normal line direction Dv of the base surface 561*b*. The clearance L1 is designated, for example, as first-normal-line-direction distance L1. X1 denotes a width from the widening-direction other end 401*b* of the arm one end 401 to the insertion hole 564*a* in the arm end widening direction Dw. Y1 denotes a width of the other-side receiving surface 564*e* in the arm end widening direction Dw. Since the width X1 and the width Y1 are in a relation expressed as "Y1≥X1" as shown in FIG. 39, when the Formula F1 holds, the Formula F2 also holds.

Figure 40:
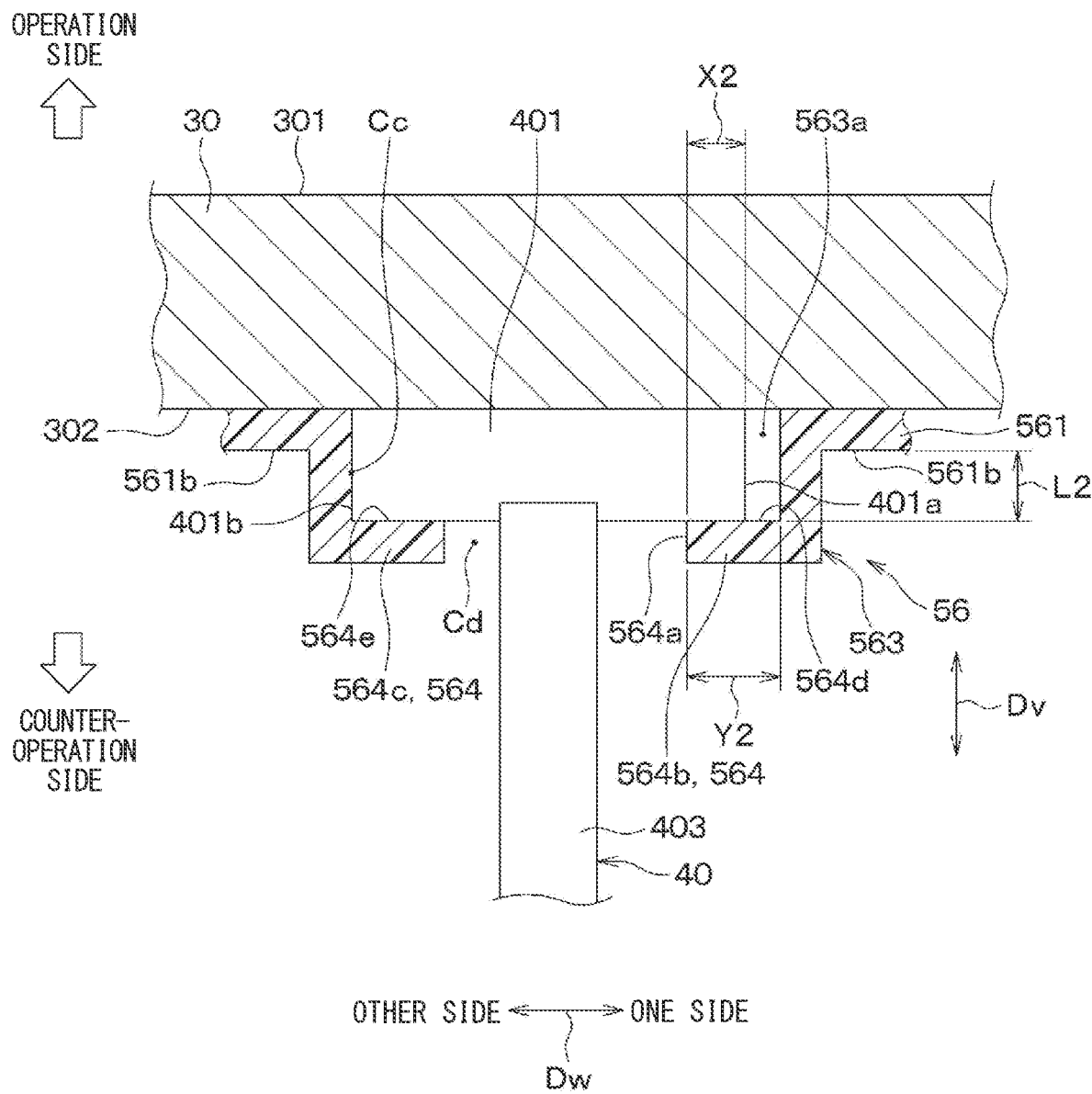
FIG. 40 is a drawing showing the other side eccentricity state in which an arm is biased to the other side in an arm end widening direction and is abutted against a stopper part in the arm end widening direction in the twenty-third embodiment, showing the same section as in FIG. 39.

The situation in other side biased state, which is a state shown in FIG. 40, is also similar to the situation in the above-mentioned one side biased state. That is, in the other side biased state, the widening-direction one end 401*a* of the arm one end 401 is located between the insertion hole 564*a* and one side in the arm end widening direction Dw and at the same time, the following Formula F3 and the following Formula F4 hold:

$$L2 < 2 \times X2 \quad \text{(Formula F3)}$$

$$L2 < 2 \times Y2 \quad \text{(Formula F4)}$$

The above-mentioned other side biased state in the present embodiment is a state in which the arm 40 is biased to the other side in the arm widening direction Dw and abutted against the stopper prat 56 in the arm end widening direction Dw. In other words, the other side biased state is a state in which a clearance Cc between the widening-direction other end 401*b* of the arm one end 401 and an inner wall surface of the protruded portion 563 opposed to the widening-direction other end 401*b* or a clearance Cd between the arm body 403 and the other side receiving portion 564*c* of the first arrangement section 564 is not present. FIG. 40 shows a state in which of the clearances Cc, Cd, the clearance Cc is not present.

In the above-mentioned Formula F3 and Formula F4, L2 denotes a clearance along the normal line direction Dv of the base surface 561*b* or a clearance between a portion of the one-side receiving surface 564*d* of the stopper part 56 located farthest to the counter-operation side in the normal line direction Dv of the base surface 561*b*. The clearance L2 is designated, for example, as second-normal-line-direction distance L2. X2 denotes a width from the widening-direction one end 401*a* of the arm one end 401 to the insertion hole 564*a* in the arm end widening direction Dw. Y2 denotes a width of the one-side receiving surface 564*d* in the arm end widening direction Dw. Since the width X2 and the width Y2 are in a relation expressed as "Y2 X2" as shown in FIG. 40, when the Formula F3 holds, the Formula F4 also holds. In the present embodiment, for example, the second-normal-line-direction distance L2 is identical with the first-normal-line-direction distance L1 in dimension.

(1) Here, a detachable structure will be assumed as a comparative example, such as a snap-fit structure, in which one member can be detached from the other member by elastic deformation of the one member. In this detachable structure, in general, a length L3 equivalent to the above-mentioned normal line direction distances L1, L2 and a width X3 equivalent to the above-mentioned widths X1, X2 are in a relation expressed by Formula F5 below. The length L3 and a width Y3 equivalent to the above-mentioned widths Y1, Y2 are in a relation expressed by Formula F6 below.

$$L3 \geq 2 \times X3 \quad \text{(Formula F5)}$$

$$L3 \geq 2 \times Y3 \quad \text{(Formula F6)}$$

According to the present embodiment, meanwhile, Formula F1 holds in the one side biased state and Formula F3 holds in the other side biases state. Therefore, the structure in which the stopper part 56 holds the arm one end 401 in the housing space 563*a* is not such a detachable structure as in the above-mentioned comparative example. That is, the arm one end 401 can be prevented from getting out of the housing space 563*a* due to elastic deformation of the one side receiving portion 564*b* or other side receiving portion 564*c* of the first arrangement section 564; therefore, the reliability of the pedal device 1 can be enhanced.

The present embodiment is identical with the first embodiment except the foregoing. In the present embodiment, the effects brought about by configuration elements common to those in the first embodiment can be obtained as in the first embodiment.

The present embodiment is a modification to the first embodiment but may be combined with any of the above-mentioned other embodiments as long as the protruded portion 35, 563 housing the arm one end 401 is formed of resin.

When, for example, a modification in which the protruded portion 35 (Refer to FIG. 14) is formed of resin is assumed as a modification to the third embodiment, the present embodiment can be combined with this modification to the third embodiment. In this case, in the one side biased state, the arm 40 is abutted against the pedal pad 30 (Refer to FIG. 14), not against the stopper part 56, in the arm end widening direction Dw. Also in the other side biased state, the arm 40 is abutted against the pedal pad 30, not against the stopper part 56, in the arm end widening direction Dw.

Other Embodiments (1) In each of the above-mentioned embodiments, the pedal device 1 is used as a brake pedal device but this is just an example. For example, the pedal device 1 may be one that is used as an accelerator pedal deice operated to adjust an output of a driving source of a vehicle 80.

(2) In each of the above-mentioned embodiments, the pedal device 1 is a brake pedal device used in a brake-by-wire system but this is just an example. For example, the vehicle 80 equipped with the pedal device 1 does not adopt a brake-by-wire system and the pedal device 1 may be so configured that the pedal pad 30 is mechanically coupled with a master cylinder constituting a brake system.

In each of the above-mentioned embodiments, as shown in FIG. 3, the reaction force generation mechanism 50 includes a plurality of spring members 511, 512, 513 but the reaction force generation mechanism 50 may include only one spring member.

The reaction force generation mechanism 50 may generate reaction force against stepping force by any other mechanical configuration than the spring members 511, 512, 513. For example, in a vehicle 80 that does not adopt a brake-by-wire system, a mechanical configuration including a hydraulic cylinder and the like generating liquid pressure for driving a brake pad corresponds to the reaction force generation mechanism 50.

(4) In each of the above-mentioned embodiments, as shown in FIG. 5, for example, the arm body 403 in a linearly extended shape but this is just an example. For example, the arm body 403 may be in a curvedly extended shape.

(5) In each of the above-mentioned embodiments, as shown in FIG. 13, for example, the pedal device 1 is an organ type pedal device but may be a pedal device of any other type than organ type.

For example, in each embodiment, the pedal device 1 is of an organ type; therefore, the pedal axial center CL is provided in a position closer to the lower end 304 of the pedal pad 30 than to the upper end 303 of the pedal pad 30. Contrarily, as an example of a pedal device of any other type than organ type, a configuration in which the pedal axial center CL is provided in a position closer to the upper end 303 than to the lower end 304 of the pedal pad 30 can be assumed. In the case of such a configuration, for example, the arm 40 is located vehicle downward relative to the pedal axial center CL located close to the upper end 303 of the pedal pad 30. The pedal pad 30 is rotationally moved so that the lower end 304 of the pedal pad 30 is more displaced vehicle downward or vehicle frontward as stepping force applied to the pedal pad 30 by an operator 81 from the operation side is more increased.

(6) In the first embodiment, as shown in FIG. 3 and FIG. 4, the arm one end 401 is in such a shape as to be widened from the arm body 403 in the arm end widening direction Dw and the arm end widening direction Dw is a direction along the pedal axial center CL but this is just an example. For example, when the arm 40 is slidably coupled with the pedal pad 30 in the section in FIG. 3, the arm one end 401 may be in such a shape as to be widened from the arm body 403 to a direction orthogonal to the pedal axial center CL.

(7) In the twenty-third embodiment, Formula F1 holds in the one side biased state shown in FIG. 39 and Formula F3 holds in the other side biased state shown in FIG. 40. With respect to L1, L2, this limitation is acceptable; more favorably, for example, the protruded portion 563 may be so configured that a relation expressed as "$L1<X1/2$" holds in the one side biased state and a relation expressed as "$L2<X2/2$" holds in the other side biased state.

(8) The present disclosure is not limited to the above-mentioned embodiments and may be variously modified. The above-mentioned embodiments are not irrelevant to one another and may be combined as appropriate unless a combination is obviously infeasible.

In each of the above-mentioned embodiments, needless to add, elements constituting an embodiment are not necessarily indispensable unless it is clearly described that some element is especially indispensable or it is supposed in principle that some element is obviously indispensable. When in relation to each of the above-mentioned embodiments, a numerical value, such as a number of pieces, a numeric value, a quantity, a range, or the like of a configuration element of the embodiment is referred to, the specific numerical value is not definite unless it is clearly described that the numerical value is indispensable or the numerical value is obviously definite in principle.

When in relation to each of the above-mentioned embodiments, a material, a shape, a positional relation, or the like of a configuration element or the like is referred to, the material, shape, positional relation, or the like is not definite unless it is especially clearly described that the material, shape, positional relation, or the like is definite or the specific material, shape, positional relation, or the like is definite in principle.

What is claimed is:

1. A pedal device to be provided in a vehicle, the pedal device comprising:
   a pedal pad configured to be stepped on by an operator from a predetermined operation side;
   an arm including an arm one end and an arm body extended from the arm one end to a counter-operation side, which is opposite to the operation side, the arm coupled with the pedal pad at the arm one end and coupled with a reaction force generation mechanism on the counter-operation side, the reaction force generation mechanism configured to generate a reaction force against a stepping force applied to the pedal pad by the operator; and
   a stopper part that is a component separate from the pedal pad and fixed to the pedal pad, wherein
   the arm one end is widened from the arm body in a widening direction, which is perpendicular to an extending direction in which the arm body is extended,
   one part, which is one of the pedal pad and the stopper part, includes a first arrangement section that has an insertion hole, into which the arm body is inserted, and located on the counter-operation side relative to the arm one end,
   an other part, which is an other of the pedal pad and the stopper part, includes a second arrangement section located on the operation side of the first arrangement section across the arm one end,
   the first arrangement section and the second arrangement section hold the arm one end against the pedal pad in a state where the arm one end is interposed between the first arrangement section and the second arrangement section,
   the pedal pad is rotationally movable about a pedal axial center in conjunction with a stepping operation by the operator,
   the widening direction is a direction along the pedal axial center, and
   the arm one end is in a solid tubular shape having an axial center parallel with the pedal axial center.

2. The pedal device according to claim 1, wherein the first arrangement section is formed of metal.

3. The pedal device according to claim 1, wherein the first arrangement section is formed of resin.

4. The pedal device according to claim 1, wherein
the one part includes
a base surface facing to the counter-operation side and
a protruded portion formed of resin and protruded from the base surface,
the protruded portion includes the first arrangement section at a top in its protruded shape of the protruded portion,
the protruded portion has a housing space that
accommodates the arm one end,
connects to the insertion hole, and
extends to the counter-operation side beyond the base surface,
the arm one end includes
a widening-direction one end provided on one side in the widening direction and
a widening-direction other end provided on an other side in the widening direction,
the first arrangement section includes
a one-side receiving surface
facing the housing space on the operation side and
located on the one side of the insertion hole in the widening direction and an other-side receiving surface
facing the housing space on the operation side and
located on the other side of the insertion hole in the widening direction,
in a state, in which the arm is biased to the one side in the widening direction and abutted against the pedal pad or the stopper part in the widening direction,
the widening-direction other end is positioned on the other side of the insertion hole in the widening direction, and
a first-normal-line-direction distance is less than twice a width, which is from the widening-direction other end to the insertion hole in the widening direction,
wherein the first-normal-line-direction distance is along a normal line direction of the base surface,
wherein the first-normal-line-direction distance is between the base surface and a portion of the other-side receiving surface, which is farthest on the counter-operation side in the normal line direction, and
in a state, in which the arm is biased to the other side in the widening direction and abutted against the pedal pad or the stopper part in the widening direction,
the widening-direction one end is positioned on the one side of the insertion hole in the widening direction, and
a second-normal-line-direction distance is less than twice a width, which is from the widening-direction one end to the insertion hole in the widening direction,
wherein the second-normal-line-direction distance is along the normal line direction,
wherein the second-normal-line-direction distance is between the base surface and a portion of the one-side receiving surface, which is farthest on the counter-operation side in the normal line direction.

5. The pedal device according to claim 1, wherein
the one part and the other part include metal parts, respectively, and are joined to each other by welding the metal parts.

6. The pedal device according to claim 1, wherein
one of the one part and the other part includes a boss,
an other of the one part and the other part has a hole, and
the one part and the other part are joined to each other by press fitting the boss into the hole.

7. The pedal device according to claim 1, wherein
one of the one part and the other part includes a boss, which is made of metal,
an other of the one part and the other part has a through hole, and
the one part and the other part are joined to each other by caulking the boss, which is inserted into the through hole.

8. The pedal device according to claim 1, wherein
the one part and the other part are joined to each other by screw fixing.

9. The pedal device according to claim 1, wherein
one of the one part and the other part includes a boss,
an other of the one part and the other part has a through hole, in which the boss inserted, and
the one part and the other part are joined to each other by a retaining ring, which is locked to the boss.

10. The pedal device according to claim 1, wherein
one of the one part and the other part includes a boss made of resin,
an other of the one part and the other part has a through hole, and
the one part and the other part are joined to each other by thermal caulking of the boss, which is inserted into the through hole.

11. The pedal device according to claim 1, wherein
one of the one part and the other part includes an insert, which is made of metal and integrally fixed to a resin part by insert molding, and
the one part and the other part are joined to each other by screw fastening the other of the one part and the other part to the insert.

12. The pedal device according to claim 1, wherein
the one part and the other part are joined to each other by a snap-fit structure.

13. The pedal device according to claim 1, wherein
the pedal device is to be provided, as a brake pedal device, in the vehicle to perform a braking operation to apply brake to the vehicle.

14. The pedal device according to claim 1, wherein
the pedal device is a device in which
the pedal axial center is provided in a position closer to a lower end of the pedal pad than to an upper end of the pedal pad.

15. The pedal device according to claim 1, wherein the arm is directly coupled with the reaction force generation mechanism on the counter-operation side.

16. A pedal device to be provided in a vehicle, the pedal device comprising:
a pedal pad configured to be stepped on by an operator from a predetermined operation side;
an arm including an arm one end and an arm body extended from the arm one end to a counter-operation side, which is opposite to the operation side, the arm coupled with the pedal pad at the arm one end and coupled with a reaction force generation mechanism on the counter-operation side, the reaction force generation mechanism configured to generate a reaction force against a stepping force applied to the pedal pad by the operator; and
a stopper part that is a component separate from the pedal pad and fixed to the pedal pad, wherein
the arm one end is widened from the arm body in a widening direction, which is perpendicular to an extending direction in which the arm body is extended,
one part, which is one of the pedal pad and the stopper part, includes a first arrangement section that has an insertion hole, into which the arm body is inserted, and located on the counter-operation side relative to the arm one end, an other part, which is an other of the pedal pad and the stopper part, includes a second arrangement section located on the operation side of the first arrangement section across the arm one end, the first arrangement section and the second arrangement section hold the arm one end against the pedal pad in a state where the arm one end is interposed between the first arrangement section and the second arrangement section, the insertion hole is in a size that enables an entirety of a portion of the arm, which includes the arm body and is located on the counter-operation side of the arm one end in the extending direction, to pass through the insertion hole, and disables the arm one end from passing through the insertion hole, and the one part, as a single component, is open on the operation side with respect to the arm one end and in a shape that enables the arm one end to move from a position between the first arrangement section and the second arrangement section to the operation side.

17. A pedal device to be provided in a vehicle, the pedal device comprising:

a pedal pad configured to be stepped on by an operator from a predetermined operation side;

an arm including an arm one end and an arm body extended from the arm one end to a counter-operation side, which is opposite to the operation side, the arm coupled with the pedal pad at the arm one end and coupled with a reaction force generation mechanism on the counter-operation side, the reaction force generation mechanism configured to generate a reaction force against a stepping force applied to the pedal pad by the operator; and stopper art that is a component separate from the pedal pad and fixed to the pedal pad, wherein the arm one end is widened from the arm body in a widening direction, which is perpendicular to an extending direction in which the arm body is extended, one part, which is one of the pedal pad and the stopper part, includes a first arrangement section that has an insertion hole, into which the arm body is inserted, and located on the counter-operation side relative to the arm one end, an other part, which is an other of the pedal pad and the stopper part, includes a second arrangement section located on the operation side of the first arrangement section across the arm one end, and the first arrangement section and the second arrangement section hold the arm one end against the pedal pad in a state where the arm one end is interposed between the first arrangement section and the second arrangement section, the insertion hole is in a size that enables an entirety of a portion of the arm, which includes the arm body and is located on the counter-operation side of the arm one end in the extending direction, to pass through the insertion hole, and disables the arm one end from passing through the insertion hole, and the one part has a housing space that is recessed and accommodates the arm one end, the housing space has a housing space opening that connects to the insertion hole at a bottom of the housing space and opens on an opposite side of the insertion hole, and the housing space opening is in a size that enables the arm one end to pass through the housing space opening and covered with the second arrangement section.

\* \* \* \* \*